United States Patent
Hirano et al.

(10) Patent No.: US 7,924,842 B2
(45) Date of Patent: Apr. 12, 2011

(54) PACKET TRANSFER METHOD IN COMMUNICATION NETWORK SYSTEM AND PACKET PROCESSING METHOD IN COMMUNICATION DEVICE CONSTITUTING THE SYSTEM

(75) Inventors: Jun Hirano, Kanagawa (JP); Takahisa Aoyama, Kanagawa (JP); Takeshi Tanaka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 356 days.

(21) Appl. No.: 11/815,169

(22) PCT Filed: Jan. 27, 2006

(86) PCT No.: PCT/JP2006/301313
§ 371 (c)(1),
(2), (4) Date: Dec. 11, 2007

(87) PCT Pub. No.: WO2006/082757
PCT Pub. Date: Aug. 10, 2006

(65) Prior Publication Data
US 2009/0016264 A1  Jan. 15, 2009

(30) Foreign Application Priority Data
Feb. 2, 2005  (JP) .................. 2005-026394

(51) Int. Cl.
*H04L 12/28* (2006.01)
*H04L 12/56* (2006.01)
(52) U.S. Cl. ............... 370/393; 370/389; 370/392
(58) Field of Classification Search ............ 370/393
See application file for complete search history.

(56) References Cited

U.S. PATENT DOCUMENTS

| | | | |
|---|---|---|---|
| 2002/0009066 A1* | 1/2002 | Shimizu et al. | 370/338 |
| 2003/0053427 A1* | 3/2003 | Kanda et al. | 370/328 |
| 2003/0103496 A1* | 6/2003 | Lakshmi Narayanan et al. | 370/352 |
| 2003/0214922 A1* | 11/2003 | Shahrier | 370/331 |
| 2003/0223422 A1 | 12/2003 | Igarashi et al. | |

(Continued)

FOREIGN PATENT DOCUMENTS

JP   2003092596   3/2003

(Continued)

OTHER PUBLICATIONS

PCT International Search Report dated Apr. 11, 2006.

(Continued)

*Primary Examiner* — Salman Ahmed
*Assistant Examiner* — Tarell Hampton
(74) *Attorney, Agent, or Firm* — Dickinson Wright PLLC

(57) ABSTRACT

There is disclosed a technology in which a packet to be sent to a mobile terminal (an MN), distributed from a correspondent node (a CN), can surely reach the MN even in a situation in which the MN is moving. According to the technology, identification information of a plurality of access routers (ARs) 300 potentially currently connected to the MN is added to an IP packet to be transmitted from a CN 500 to an MN 200. When the AR receives this IP packet, the AR judges whether or not the MN is connected thereunder. If the MN exists under the AR, the IP packet is transmitted to the MN. On the other hand, if any MN does not exist under the AR, the IP packet is transferred to another AR based on the identification information added to the IP packet. As a result, the IP packet is successively transferred between the plurality of ARs so that the IP packet can be passed to the MN under the AR currently connected to the MN.

12 Claims, 21 Drawing Sheets

U.S. PATENT DOCUMENTS

| | | | |
|---|---|---|---|
| 2004/0004967 A1* | 1/2004 | Nakatsugawa et al. | 370/400 |
| 2004/0071120 A1* | 4/2004 | Grech | 370/338 |
| 2004/0156346 A1* | 8/2004 | O'Neill | 370/338 |
| 2005/0128969 A1* | 6/2005 | Lee et al. | 370/313 |
| 2006/0018291 A1* | 1/2006 | Patel et al. | 370/335 |
| 2006/0056382 A1* | 3/2006 | Yamada et al. | 370/349 |
| 2006/0240825 A1* | 10/2006 | Funabiki et al. | 455/436 |

FOREIGN PATENT DOCUMENTS

| | | |
|---|---|---|
| JP | 2004056770 | 2/2004 |
| JP | 2004282249 | 10/2004 |
| JP | 2006041955 | 2/2006 |

OTHER PUBLICATIONS

D. Johnson, et al., "Mobility Support in IPv6," IETF Mobile IP Working Group, Internet-Draft: draft-ietf-mobileip-ipv6-24.txt, Work-In-Progress, Jun. 30, 2003, pp. 1-172.

A. Conta, et al., "Generic Packet Tunneling in IPv6 Specification," Network Working Group, Dec. 1998, pp. 1-36.

S. Deering, et al., "Internet Protocol, Version 6 (IPv6), Specification" Network Working Group, Dec. 1998, pp. 1-39.

P. Ferguson, "Network Ingress Filtering: Defeating Denial of Service Attacks which Employ IP Source Address Spoofing,"Network Working Group, Jan. 1998, pp. 1-10.

R. Koodli, Editor, "Fast Handovers for Mobile IPv6" Mobile IP Working Group, Internet Draft: draft-ietf-mipshop-fast-mipv6-01. txt, Work-In-Progress, Jan. 30, 2004, pp. i-ii, and 1-38.

R. Boivie, et al., "Explicit Multicast (Xcast) Basic Specification," Internet Draft: draft-ooms-xcast-basic-spec-05.txt, Work-In-Progress, Aug. 2003, pp. 1-29.

Y. Ezaki, et al., "Mobile IPv6 handoff bi Explicit Multicast," Internet Draft: draft-ezaki-handoff-xcast-01.txt, Work-In-Progress, May 2001, 17 pages total.

* cited by examiner

FIG. 9 PRIOR ART

| VERSION | TRAFFIC CLASS | FLOW LABEL | |
|---|---|---|---|
| PAYLOAD LENGTH | | NEXT HEADER LENGTH | HOP LIMIT |聽

SOURCE ADDRESS
(IP ADDRESS OF CN)

DESTINATION ADDRESS
(HOME ADDRESS OF MN)

PAYLOAD

FIG. 10 PRIOR ART

| VERSION | TRAFFIC CLASS | FLOW LABEL | |
|---|---|---|---|
| PAYLOAD LENGTH | | NEXT HEADER LENGTH | HOP LIMIT |

SOURCE ADDRESS
(IP ADDRESS OF CN)

DESTINATION ADDRESS
(CARE OF ADDRESS OF MN)

| NEXT HEADER | EXTENSION HEADER LENGTH | ROUTING TYPE | REMAINING SEGMENT |
|---|---|---|---|

RESERVE

HOME ADDRESS
(HOME ADDRESS OF MN)

PAYLOAD

PACKET TRANSFER METHOD IN COMMUNICATION NETWORK SYSTEM AND PACKET PROCESSING METHOD IN COMMUNICATION DEVICE CONSTITUTING THE SYSTEM

TECHNICAL FIELD

The present invention relates to an internet protocol (IP) mobility technology capable of continuing communication between a mobile terminal (hereinafter sometimes referred to as a mobile node: MN) being moving and a node of an IP network even in a situation in which the mobile terminal continuously changes a connected destination to the IP network in response to movement of the mobile terminal.

BACKGROUND ART

As one of IP mobility technologies heretofore known, a mobile internet protocol version 6 (mobile IPv6) technology is disclosed in Non-patent Document 1 described below. The mobile IPv6 technology is a technology capable of receiving a packet to be sent to an MN even in a case where the MN changes an access router (hereinafter sometimes referred to as the AR) which is a connected destination to an IP network.

The mobile IPv6 technology includes the following procedure by which the MN can receive an IP packet to be sent to a home address (hereinafter sometimes referred to as the HoA) assigned to the MN at a new connected destination to the IP network.

When the MN changes the AR to be connected and acquires a new IP address (hereinafter sometimes referred to as a care-of address or a CoA), the MN notifies a home agent (hereinafter sometimes referred to as the HA) of a home network connected to the IP network of the CoA. The IP packet transmitted to the HoA from a correspondent node (hereinafter sometimes referred to as the CN) which is a communication partner (a communication partner device) of the MN is sent to the home network via the IP network. However, the HA is notified that the MN acquires the CoA. Therefore, this IP packet to be sent to the CoA is subjected to packet tunneling (see Non-patent Document 2 described below), and a routing header (see Non-patent Document 3 described below) in which the HoA is described is added before transmitting the packet. This IP packet transmitted to the CoA reaches the MN via the IP network, and the MN processes the routing header added to the IP packet to recognize that this IP packet is addressed to itself (the HoA).

Moreover, according to the mobile IPv6 technology, by the following procedure, the MN can transmit the IP packet to the CN from the new connected destination to the IP network.

To transmit the IP packet to the CN, the MN cannot set the HoA as a source of the IP packet. This is because a router of the IP network does not transfer the IP packet transmitted from a network-topologically contradictory address, and discards the packet based on a security problem (see Non-patent Document 4 described below). Therefore, the MN subjects the IP packet to be sent to the CN to the packet tunneling in order to send the packet to the HA, and adds a home address option in which the HoA is described to transmit the packet. This IP packet transmitted from the MN to the HA is sent to the HA via the IP network. The HA processes the home address option added to the IP packet to recognize that the IP packet is a packet transmitted from the MN. After subjecting the packet to packet detunneling (see Non-patent Document 3), the packet is sent to the home network. This IP packet transmitted from the HA to the CN is sent to the CN via the IP network.

Moreover, according to the mobile IPv6 technology, by the following procedure, the MN can receive the IP packet from the CN via the new connected destination to the IP network without passing through the HA. It is to be noted that this function is referred to as route optimization. The above technique concerned with the transmission of the IP packet via the HA is possible even in a case where the CN does not correspond to the route optimizing function. However, the technique concerned with the transmission of the IP packet without passing through the HA as described below is possible in an only case where the CN corresponds to the route optimizing function.

On changing the AR to be connected and acquiring the CoA, the MN notifies the HA of the CoA and also notifies the CN of the CoA. When the CN corresponds to the route optimization, the CN returns a response message to this notice. In the following description, it is assumed that the CN corresponds to the route optimization. To transmit the IP packet to the MN, the CN adds the routing header in which the HoA is described to a transmission packet, and transmits the IP packet to the CoA. This IP packet transmitted from the CN to the CoA is sent to the MN via the IP network. The MN processes the routing header added to the IP packet to recognize that this IP packet is to be sent to itself (the HoA).

Furthermore, according to the mobile IPv6 technology, by the following procedure, the MN can transmit the packet to be sent to the CN corresponding to the route optimization from the new connected destination to the IP network without passing through the HA.

As described above, to transmit the IP packet to the CN, the MN cannot set the HoA as the source of the IP packet. Therefore, the MN sets the CoA as a source address, and adds the home address option in which the HoA is described before transmitting the packet. This IP packet transmitted from the MN to the CN is sent to the CN via the IP network. The CN corresponding to the route optimization processes the home address option added to the IP packet to recognize that this IP packet is a packet transmitted from the MN.

On the other hand, as one of problems of the mobile IPv6 technology, in a case where the MN has a state in which a certain CoA (hereinafter referred to as the old CoA here) is acquired, and changes from a state in which the MN is connected to a certain AR (referred to as the old AR here) to a state in which the MN is disconnected from the old AR and is connected to another new AR to acquire a new CoA, there is a problem that, in some case, the IP packet transferred or transmitted from the HA or the CN to the old CoA before the disconnection from the old AR does not reach the MN connected to the new AR, before the HA or the CN is notified of the new CoA.

As one of techniques for solving this problem, a fast handover technology is disclosed in Non-patent Document 5 described below. According to the fast handover technology, the packet tunneling from the old AR (the previous access router: PAR) to a new access router (NAR) to be connected is performed to transfer, to the NAR, the packet which has reached the old CoA, before the HA or the CN is notified of the new CoA. In consequence, the MN can receive, from the NAR, the packet which has reached the old CoA.

In addition, as development of a multicast technology of transmitting the IP packets to a plurality of nodes, a technology referred to as eXplicit multicast (Xcast, see Non-patent Document 6 described below) exists. According to this Xcast technology, a plurality of destination addresses are set to the IP packet, a reception node which first receives this IP packet transfers the IP packet to another node that has not received the packet, and the transfer is successively repeated to distribute the IP packets to all of the plurality of destination addresses. Alternatively, the router which transfers this IP packet analyzes the plurality of destination addresses. In a case where the next hop (the next transfer destination) concerned with the plurality of destination addresses differs, the distribution of the IP packet is branched. In consequence, the IP packet can be multicast to all of the plurality of destination addresses. Moreover, fusion of the Xcast technology and the existing network constitution is also investigated by use of a hop-by-hop option which can be interpreted by the only router having a specific function. Furthermore, there is also a technology in which the IP packet is multicast through both base stations connected to the MN before and after the handover by use of this Xcast technology to realize smooth connection switching during the handover (see Non-patent Document 7 described below).

Non-patent Document 1: D. Johnson, C. Perkins, J. Arkko, "Mobility Support in IPv6", draft-ietf-mobileip-ipv6-24, Dec. 29, 2003, Work In Progress, <http://www.ietf.org/internet-drafts/draft-ietf-mobileip-ipv6-24.txt>.

Non-patent Document 2: Conta, A. and S. Deering, "Generic Packet Tunneling in IPv6 Specification", RFC2473, December 1998, <http://www.ietf.org/rfc/rfc2473.txt>.

Non-patent Document 3: Deering, S. and R. Hinden, "Internet Protocol, Version 6 (IPv6) Specification", RFC 2460, December 1998, <http://www.ietf.org/rfc/rfc2460.txt>.

Non-patent Document 4: Ferguson, P. and D. Senie, "Network Ingress Filtering: Defeating Denial of Service Attacks which employ IP Source Address Spoofing", RFC 2267, January 1998, <http://www.ietf.org/rfc/rfc2267.txt>.

Non-patent Document 5: K. Rajeev, "Fast Handovers for Mobile IPv6", draft-ietf-mipshop-fast-mipv6-01, Jan. 30, 2004, Work In Progress, <http://www.ietf.org/internet-drafts/draft-ietf-mipshop-fast-mipv6-01.txt>.

Non-patent Document 6: R. Boivie, N. Feldman, Y. I mai, W. Livens, D. Ooms, O. Paridaens, "Expilicit Multicast (Xcast) Basic Specification", draft-ooms-xcast-basic-spec-05, August 2003, Work In Progress.

Non-patent Document 7: Y. Ezaki, Y. Imai, "Mobile IPv6 handoff by Explicit Multicast", draft-ezaki-handoff-xcast-01, May 2001, Work In Progress.

However, the above-mentioned conventional IP mobility technology has the following problems.

(A) It is possible to set only one of an IP address expected to be used by a receiver and an IP address of the AR expected to be connected to the receiver in one of a sender of the IP packet and a gateway (GW) which is present between the sender and the receiver. As a result, in a case where the IP address set by the sender is not used by the receiver currently or the receiver is not connected to the AR set by the sender, a problem occurs that the IP packet is discarded.

(B) Especially, in a case where the receiver moves at a high speed, there is a problem that the receiver causes delay in notifying the sender of information on the movement and that the problem of the above (A) remarkably appears.

(C) In the fast handover technology described in Non-patent Document 5, the packet tunneling technology between the ARs is used. In a case where the receiver moves at a high speed and moves over many ARs, a problem of scalability is generated.

(D) In the Xcast technology described in Non-patent Document 6, since all of the destination addresses described in the IP packet need to be successively visited, there is a problem that much time is required until the final node is reached. When a trouble is generated in an intermediate node or the intermediate node moves and the packet cannot therefore reach the packet, there is a problem that any packet is not distributed to the subsequent node. Since the IP packet is distributed to all of the plurality of destination addresses set to the IP packet, the IP packet is branched into packets as many as the plurality of set destination addresses, and traffic might increase. These problems especially remarkably appear, as the number of the destination addresses set to the IP packet increases. Furthermore, to realize smooth communication during the handover by use of the Xcast technology described in Non-patent Document 7, the IP packet received by the MN might become redundant or lost before and after the handover, and there is a problem that efficient communication cannot necessarily be realized.

DISCLOSURE OF THE INVENTION

In view of the above problems, the present invention has been developed, and an object is to securely distribute, to the MN, a packet to be sent to an MN, while considering that efficient communication be realized, in a situation in which the MN is connected to one of a plurality of ARs but the AR connected to the MN among these ARs is not clarified (i.e., it is seen that the MN is potentially connected to one of the plurality of ARs, but the AR connected to the MN cannot securely be grasped).

To achieve the above object, a packet transfer method according to the present invention is a packet transfer method in a communication network system comprising: a plurality of access routers which form predetermined communication areas thereunder, respectively; a mobile terminal which is connected to at least one of the plurality of access routers to perform packet communication with an arbitrary communication device via the connected access router; and a communication partner device which is the arbitrary communication device and which performs the packet communication with the mobile terminal, the method comprising:

a connection candidate information setting step in which the communication device to perform processing concerned with an original packet adds, to the original packet, one of identification information of the plurality of access routers potentially connected to the mobile terminal and identification information of the mobile terminal for use when connected to the plurality of access routers potentially connected to the mobile terminal, respectively, as mobile terminal connection candidate information, before the original packet to be transmitted from the communication partner device to the mobile terminal reaches one of the plurality of access routers potentially connected to the mobile terminal;

a connection confirming step in which one of the plurality of access routers potentially connected to the mobile terminal confirms whether or not the access router is currently connected to the mobile terminal thereunder, in a case where a packet constituted by adding the mobile terminal connection candidate information to the original packet is received;

a packet transmission step in which the access router transmits, to the mobile terminal, the packet or the original packet constituted by removing the mobile terminal connection candidate information from the packet, in a case where it is confirmed in the connection confirming step that the mobile terminal is currently connected; and a packet transfer step in which the access router transfers the packet to another access router described in the mobile terminal connection candidate information, in a case where it is not confirmed in the connection confirming step that the mobile terminal is currently connected.

According to this constitution, while considering that efficient communication be realized, it is possible to securely distribute, to the mobile terminal (MN), the packet to be sent to the MN in a situation in which the MN is connected to one of the plurality of access routers (ARs) but the AR connected to the MN among these ARs is not clarified.

Furthermore, in addition to the above constitution, according to the packet transfer method of the present invention, in the connection candidate information setting step, the mobile terminal connection candidate information is set so as to grasp permutation of the plurality of access routers potentially connected to the mobile terminal, and in the packet transfer step, the access router transfers the packet to another access router positioned next to the permutation of the access router.

According to this constitution, the AR can clearly grasp the next hop destination of the packet, and can transfer the packet in order from the AR highly potentially connected to the MN.

Moreover, in addition to the above constitution, according to the packet transfer method of the present invention, the communication device which adds the mobile terminal connection candidate information to the original packet is at least one of the communication partner device and a gateway which connects a network including the plurality of access routers potentially connected to the mobile terminal to a network in which the communication partner device exists.

According to this constitution, the CN or the GW can add the mobile terminal connection candidate information to the original packet.

Furthermore, in addition to the above constitution, according to the packet transfer method of the present invention, the communication device which adds the mobile terminal connection candidate information to the original packet sets the mobile terminal connection candidate information in an option header of the original packet.

According to this constitution, this option header is ignored in the communication device which cannot understand the option header. Therefore, even the communication device that cannot understand the option header can relay the packet in which the mobile terminal connection candidate information is set in the option header, and the communication network system according to the present invention can easily be incorporated in the existing communication network system.

Furthermore, in addition to the above constitution, according to the packet transfer method of the present invention, the communication device which adds the mobile terminal connection candidate information to the original packet performs tunneling of the original packet, and sets the mobile terminal connection candidate information in the option header of the tunneled packet.

According to this constitution, this option header is ignored in the communication device which cannot understand any option header. Therefore, even the communication device that cannot understand the option header can relay the packet in which the mobile terminal connection candidate information is set in the option header, and the communication network system according to the present invention can easily be incorporated in the existing communication network system. Since the original packet is tunneled, perfectibility of the original packet is retained.

Moreover, in addition to the above constitution, according to the packet transfer method of the present invention, a plurality of access routers potentially subsequently connected to the mobile terminal are presumed at an arbitrary timing based on position information of the access router currently connected to the mobile terminal and arrangement position information of the plurality of access routers, and the mobile terminal connection candidate information is generated from the presumption result.

According to this constitution, it is possible to limit an AR candidate potentially connected to the MN in future from the information on the AR currently connected to the MN.

Furthermore, in addition to the above constitution, according to the packet transfer method of the present invention, in a case where a movement direction of the mobile terminal is grasped, information is deleted from the mobile terminal connection candidate information on the access router disconnected from the mobile terminal.

According to this constitution, an amount of the information included in the mobile terminal connection candidate information is limited, and the AR candidate potentially connected to the MN in future can be limited.

Moreover, in order to achieve the above object, a packet processing method according to the present invention is a packet processing method in an access router of a communication network system comprising: a plurality of access routers which form predetermined communication areas thereunder, respectively; and a mobile terminal which is connected to at least one of the plurality of access routers to perform packet communication with a communication partner device via the connected access router, the method comprising:

a packet reception step in which a communication device to perform processing concerned with an original packet receives a packet constituted by adding, to the original packet, at least one of identification information of the plurality of access routers potentially connected to the mobile terminal and identification information of the mobile terminal for use when connected to the plurality of access routers potentially connected to the mobile terminal, respectively, as mobile terminal connection candidate information, before the original packet to be transmitted from the communication partner device to the mobile terminal reaches at least one of the plurality of access routers potentially connected to the mobile terminal;

a connection confirming step in which the access router confirms whether or not the access router is currently connected to the mobile terminal thereunder, in a case where a packet constituted by adding the mobile terminal connection candidate information to the original packet is received;

a packet transmission step in which the access router transmits, to the mobile terminal, the packet or the original packet constituted by removing the mobile terminal connection candidate information from the packet, in a case where it is confirmed in the connection confirming step that the mobile terminal is currently connected; and a packet transfer step in which the access router transfers the packet to another access router described in the mobile terminal connection candidate information, in a case where it is not confirmed in the connection confirming step that the mobile terminal is currently connected.

According to this constitution, while considering that efficient communication be realized, it is possible to securely distribute, to the MN, the packet to be sent to the MN in a situation in which the MN is connected to one of the plurality of ARs but the AR connected to the MN among these ARs is not clarified.

Moreover, in order to achieve the above object, a packet transfer method according to the present invention is a packet processing method in a communication partner device of a communication network system comprising: a plurality of access routers which form predetermined communication areas thereunder, respectively; a mobile terminal which is connected to at least one of the plurality of access routers to perform packet communication with an arbitrary communication device via the connected access router; and a communication partner device which is the arbitrary communication device and which performs the packet communication with the mobile terminal, the method comprising:

a connection candidate information setting step of adding, to an original packet to be transmitted from the communication partner device to the mobile terminal, one of identification information of the plurality of access routers potentially connected to the mobile terminal and identification information of the mobile terminal for use when connected to the plurality of access routers potentially connected to the mobile terminal, respectively, as mobile terminal connection candidate information; and a packet transmission step of transmitting the packet constituted by adding the mobile terminal connection candidate information to the original packet.

According to this constitution, while considering that efficient communication be realized, it is possible to securely distribute, to the MN, the packet to be sent to the MN in a situation in which the MN is connected to one of the plurality of ARs but the AR connected to the MN among these ARs is not clarified.

Moreover, to achieve the above object, a packet transfer method of the present invention is a packet processing method in a gateway of a communication network system comprising: a plurality of access routers which form predetermined communication areas thereunder, respectively; a mobile terminal which is connected to at least one of the plurality of access routers to perform packet communication with an arbitrary communication device via the connected access router; a communication partner device which is the arbitrary communication device and which performs the packet communication with the mobile terminal; and the gateway which connects a network including the plurality of access routers to a network in which the communication partner device exists, the method comprising:

a packet reception step of receiving an original packet transmitted from the communication partner device to the mobile terminal;

a connection candidate information setting step of adding, to the original packet, at least one of identification information of the plurality of access routers potentially connected to the mobile terminal and identification information of the mobile terminal for use when connected to the plurality of access routers potentially connected to the mobile terminal, respectively, as mobile terminal connection candidate information; and a packet transmission step of transmitting the packet constituted by adding the mobile terminal connection candidate information to the original packet.

According to this constitution, while considering that efficient communication be realized, it is possible to securely distribute, to the MN, the packet to be sent to the MN in a situation in which the MN is connected to one of the plurality of ARs but the AR connected to the MN among these ARs is not clarified.

The present invention has the above constitutions, and it is possible to securely distribute, to the MN, the packet to be sent to the MN even in a situation in which the MN is moving.

BRIEF DESCRIPTION OF THE DRAWINGS

FIG. 9 is a diagram showing one example of a packet format according to usual IPv6;

FIG. 10 is a diagram showing one example of a packet format according to usual mobile IPv6;

BEST MODE FOR CARRYING OUT THE INVENTION

First to fourth embodiments of the present invention will hereinafter be described with reference to the drawings. First, a concept of the present invention will be described. According to the present invention, in a situation in which an MN is connected to one of a plurality of ARs but the AR connected to the MN among these ARs is not clarified (i.e., it is seen that the MN might be connected to at least one of the plurality of ARs, but the AR connected to the MN cannot securely be grasped), a packet to be sent to the MN is distributed to one of the plurality of ARs potentially connected to the MN, and the AR which has received this packet judges whether or not the MN exists under the AR. When the MN exists under the AR, the packet is transferred to the MN. On the other hand, when the MN does not exist under the AR, the packet is transferred to another AR potentially connected to the MN. As a result, the plurality of AR potentially connected to the MN successively judges whether or not the packet can be transferred to the MN.

It is to be noted that examples of a situation in which a connected destination of the MN is not clarified as described above include a situation in which the MN performs handover between different ARs to switch the AR as the connected destination and in which the AR currently connected to the MN is not clarified for a sender or a relay of the packet to the MN. Especially, a case where the MN exists in a mobile member such as a vehicle or a train which moves along a predetermined track (a road or a railway), a plurality of ARs are arranged along this predetermined track and the MN moves along the predetermined track while switching the connection to the AR will be described as one example. In such a constitution (e.g., the constitution shown in FIG. 1), communication cells formed of access points (APs) existing under the ARs are arranged so as to cover the whole predetermined track. Description of an operation concerned with the APs is omitted, as long as the description is not especially needed.

Figure 1:
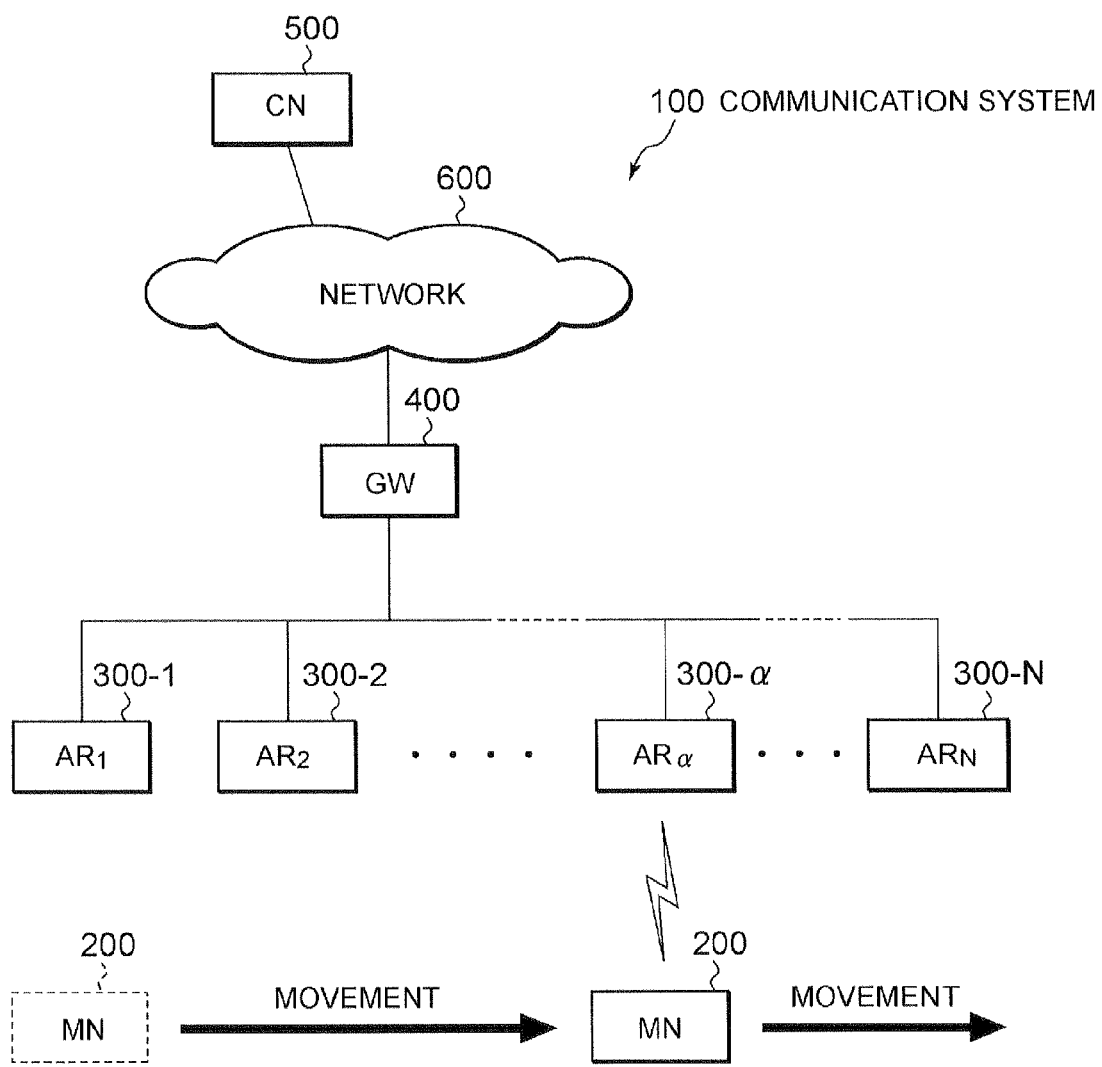
FIG. 1 is a diagram showing a constitution of a communication system common to first to fourth embodiments of the present invention.

First, a constitution of a communication system common to first to fourth embodiments of the present invention will be described. FIG. 1 is a diagram showing the constitution of the communication system common to the first to fourth embodiments of the present invention. A communication system 100 shown in FIG. 1 includes a mobile node (an MN) 200, a plurality access routers AR 300-1 to AR 300-N, a gateway (a GW) 400, a correspondent note (a CN) 500 and a network 600 which connects the GW 400 to the CN 500. It is to be noted that in the communication system 100, the plurality of (N) ARs 300-1 to 300-N are arranged along a predetermined track (not shown). FIG. 1 shows the $AR_1$ 300-1, the $AR_2$ 300-2, the $AR_\alpha$ 300-$\alpha$ and the $AR_N$ 300-N. In the present description, when a specific AR is referred, a subscript is used as in the $AR_1$ 300-1. However, when the AR does not have to be especially specified, the AR 300 is simply described. A configuration of the network shown in FIG. 1 is one example, and the present invention may be applied to a system having another configuration of the network.

In the communication system 100 shown in FIG. 1, the network 600 connected to another network via the GW 400 is connected to the CN 500, and the other network (the network under the GW 400) is connected to a plurality of ARs 300. It is to be noted that in the following, the side of the network 600 connected to the CN 500 with respect to the GW 400 is sometimes referred to as the outside of the GW 400, and the side of the network provided under the GW 400 and connected to the plurality of ARs 300 with respect to the GW 400 is sometimes referred to as the inside of the GW 400.

The MN 200 is a movable node which can be connected to one of the plurality of ARs 300 to communicate with the AR. The CN 500 is a communication partner of this MN 200. It is to be noted that the MN 200 can communicate with the CN 500 through the network 600 (e.g., an internet) via one of the plurality of ARs 300 connected to the MN 200 and the GW 400. It is to be noted that here the movable node is referred to as the MN, but may be referred to as a mobile router (an MR) having a mobile network thereunder.

Moreover, each of the ARs 300 is a node which can permit connection to the MN 200 to communicate. The GW 400 has a function of connecting different networks (the network connected to the plurality of ARs 300 and the network 600 connected to the CN 500) to each other.

Constitutions and operations in a case where the present invention is applied to the above-mentioned communication system shown in FIG. 1 according to the first to fourth embodiments of the present invention.

First Embodiment

Figure 2:
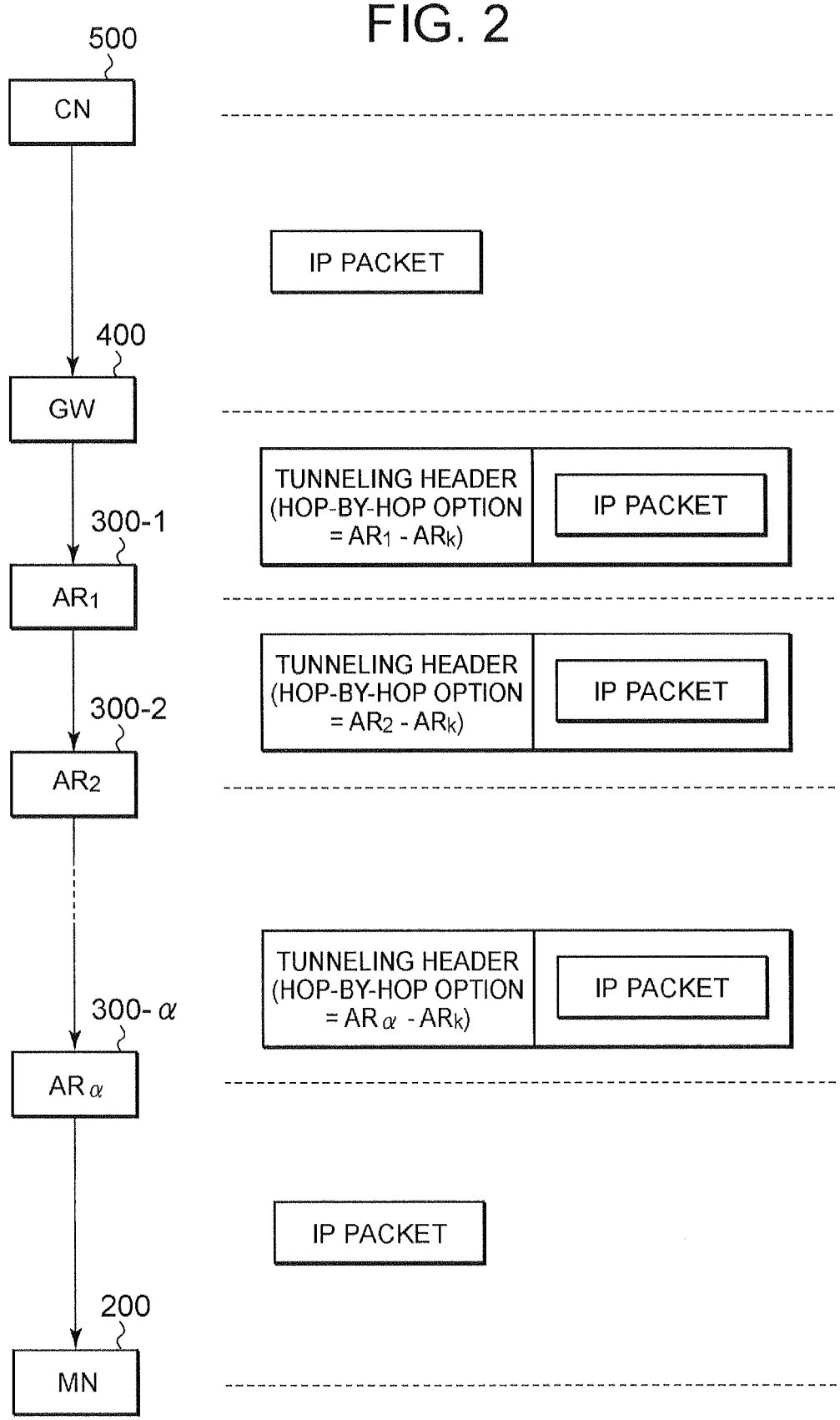
FIG. 2 is a diagram schematically showing one example of a packet to be transferred according to the first embodiment of the present invention.

First, a first embodiment of the present invention will be described. In this first embodiment, for example, as shown in FIG. 2, a case where a packet transmitted from a CN 500 to an MN 200 is subjected to packet tunneling by a GW 400, information on ARs 300-1 to 300-$a$ potentially connected to the MN 200 is added to the packet, an IP packet is transferred between the ARs 300 based on this information and the MN 200 finally receives the IP packet from the AR 300 as a connected destination will be described.

Figure 3:
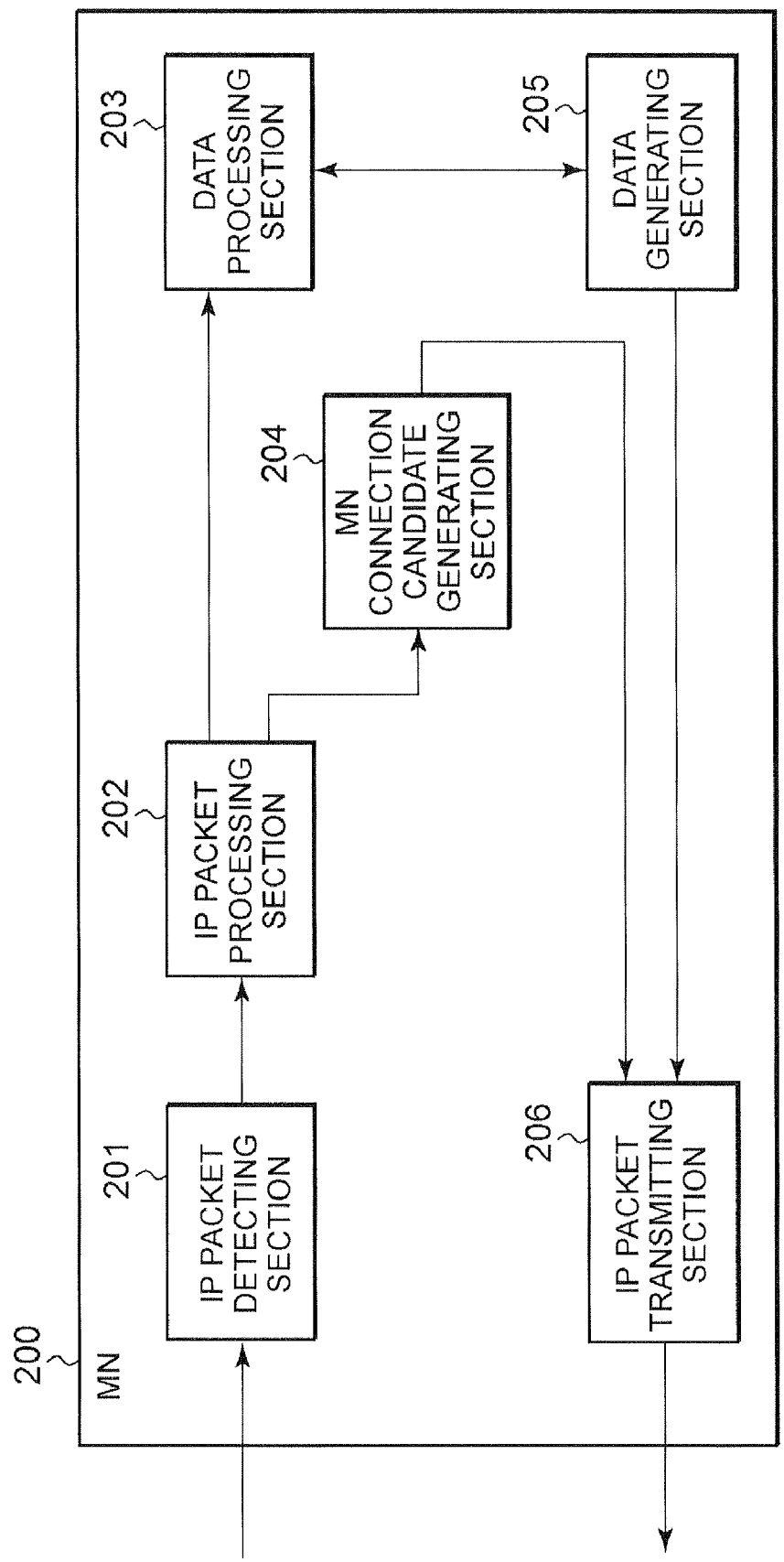
FIG. 3 is a diagram showing a constitution of an MN according to the first embodiment of the present invention.
Figure 4:
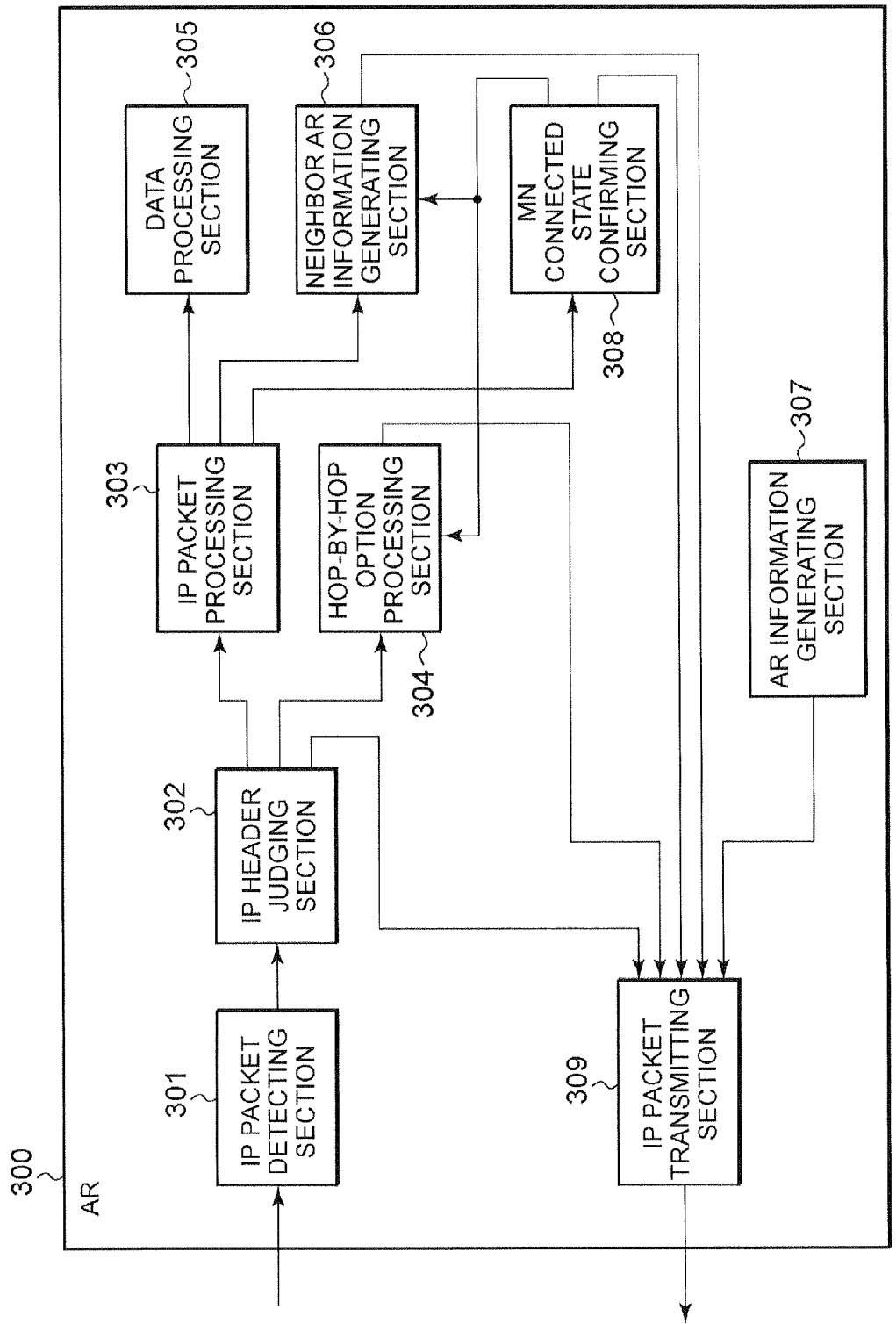
FIG. 4 is a diagram showing a constitution of an AR according to the first embodiment of the present invention.
Figure 5:
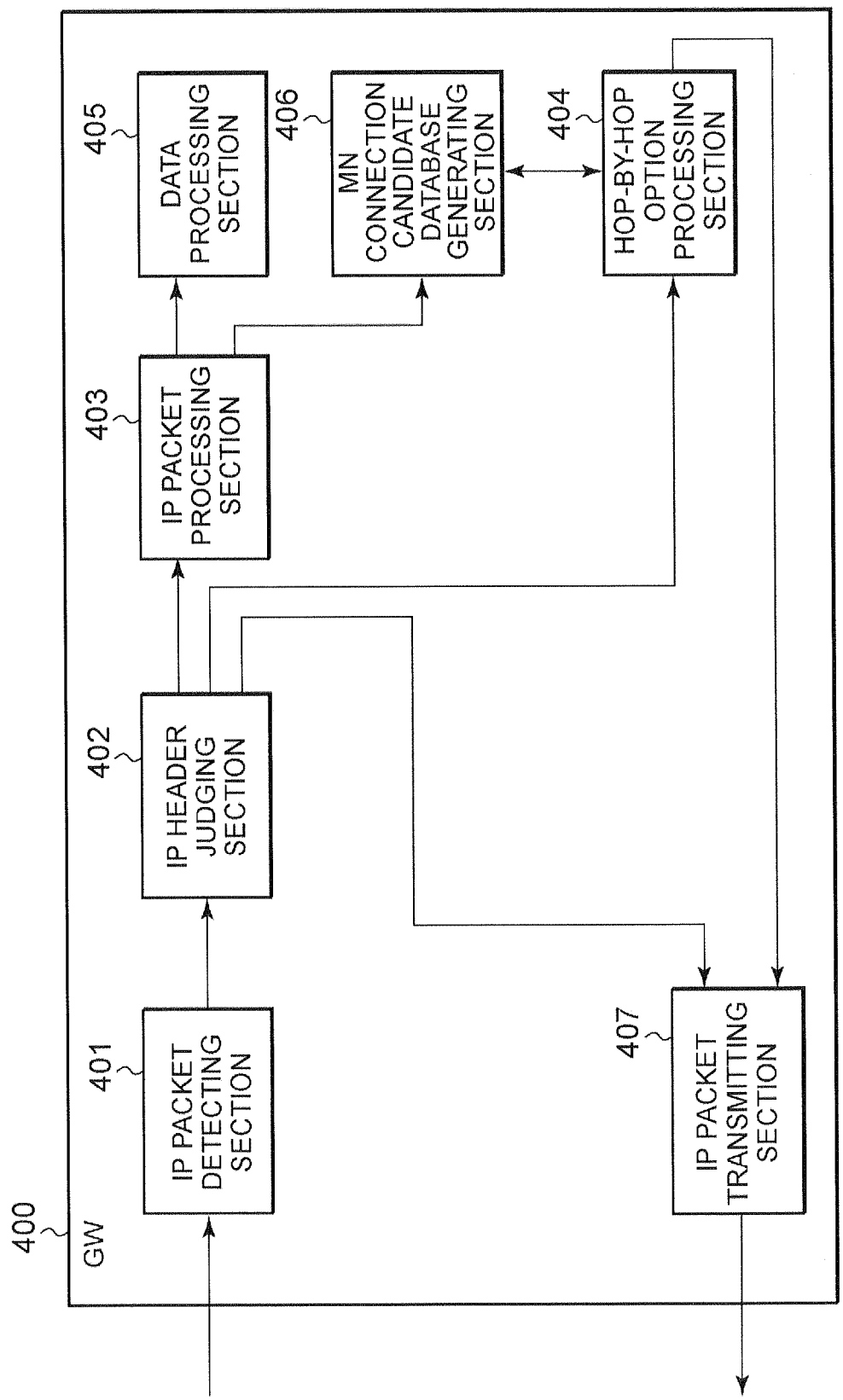
FIG. 5 is a diagram showing a constitution of a GW according to the first embodiment of the present invention.

FIGS. 3 to 5 are diagrams showing constitutions of the MN, the AR and the GW according to the first embodiment of the present invention, respectively.

First, a constitution of the MN 200 shown in FIG. 3 will be described. The MN 200 shown in FIG. 3 has an IP packet detecting section 201, an IP packet processing section 202, a data processing section 203, an MN connection candidate generating section 204, a data generating section 205 and an IP packet transmitting section 206.

The IP packet detecting section 201 is a processing section which detects an IP packet from a signal received by the MN 200 to take out the IP packet. The IP packet processing section 202 is a processing section which processes the IP packet taken out by the IP packet detecting section 201. The IP packet processing section 202 has a function of processing a payload of the IP packet to be sent to itself (the MN 200 itself) to send data included in this payload to the data processing section 203. The IP packet processing section 202 has a function of sending this data to the MN connection candidate generating section 204, in a case where the data included in the payload includes information which determines a candidate to be connected to the MN 200.

It is to be noted that this function (a connection candidate determining function) is used in an only case where the MN 200 itself generates an AR candidate to be connected to the MN 200, and the IP packet processing section 202 does not have to be provided with this connection candidate determining function. When this connection candidate determining function is not provided, the MN 200 may be realized by a heretofore used MN.

Moreover, the data processing section 203 is a processing section which processes the data sent from the IP packet processing section 202. The MN connection candidate generating section 204 is a processing section which generates information (MN connection candidate information) on the candidate to be connected to the MN 200 based on the information sent from the IP packet processing section 202. The data generating section 205 is a processing section which generates data to be transmitted by the MN 200. The IP packet transmitting section 206 is a processing section which transmits the MN connection candidate information generated by the MN connection candidate generating section 204 and the data generated by the data generating section 205 as the IP packet.

Next, a constitution of the AR 300 shown in FIG. 4 will be described. The AR 300 shown in FIG. 4 has an IP packet detecting section 301, an IP header judging section 302, an IP packet processing section 303, a hop-by-hop option processing section 304, a data processing section 305, a neighbor AR information generating section 306, an AR information generating section 307, an MN connected state confirming section 308 and an IP packet transmitting section 309.

The IP packet detecting section 301 is a processing section which detects the IP packet from a signal received by the present AR 300 to take out the IP packet. The IP header judging section 302 is a processing section which judges an IP header with respect to the IP packet taken out by the IP packet detecting section 301. As a result of the judgment of the IP header by this IP header judging section 302, the IP packet to which a hop-by-hop option is added is sent to the hop-by-hop option processing section 304, the IP packet to be sent to the present AR 300 is sent to the IP packet processing section 303, and another IP packet is sent to the IP packet transmitting section 309 in order to transfer the IP packet.

Furthermore, the IP packet processing section 303 is a processing section which processes the IP packet sent from the IP header judging section 302. The section processes a payload of the IP packet to be sent to itself (the AR itself), and data included in this payload is sent to the data processing section 305. When the data included in the payload includes information on the AR 300 existing at a neighbor area of the AR 300, the IP packet processing section 303 transmits this data to the neighbor AR information generating section 306. The hop-by-hop option processing section 304 is a processing section which processes the hop-by-hop option and which sends the processed information to the IP packet transmitting section 309. The data processing section 305 is a processing section which processes the data sent from the IP packet processing section 303.

Moreover, the neighbor AR information generating section 306 is a processing section which generates neighbor AR information including the candidate of the AR 300 to be connected to the MN 200 based on the information (the information on the neighbor AR 300) sent from the IP packet processing section 303 and which sends the generated information to the IP packet transmitting section 309. The AR information generating section 307 is a processing section which generates information (self AR notifying information) of the AR 300 itself. The MN connected state confirming section 308 is a processing section which confirms whether or not the MN 200 is connected. The IP packet transmitting section 309 is a processing section which transmits the IP packet sent from the IP header judging section 302 and the IP packet in which the hop-by-hop option is processed by the hop-by-hop option processing section 304 and which transmits the neighbor AR information generated by the neighbor AR information generating section 306 and the self AR notifying information generated by the AR information generating section 307 as the IP packet.

Furthermore, a constitution of the GW 400 shown in FIG. 5 will be described. The GW 400 shown in FIG. 5 has an IP packet detecting section 401, an IP header judging section 402, an IP packet processing section 403, a hop-by-hop option processing section 404, a data processing section 405, an MN connection candidate database generating section 406 and an IP packet transmitting section 407.

The IP packet detecting section 401 is a processing section which detects the IP packet from a signal received by the present GW 400 to take out the IP packet. The IP header judging section 402 is a processing section which judges the IP header with respect to the IP packet taken out by the IP packet detecting section 401. As a result of the judgment of the IP header by this IP header judging section 402, when it is judged that the hop-by-hop option should be added to the IP packet, the IP packet is sent to the hop-by-hop option processing section 404. The IP packet to be sent to the GW 400 itself is sent to the IP packet processing section 403. Another IP packet is sent to the IP packet transmitting section 407 in order to transfer the IP packet. It is to be noted that here, the IP header judging section 402 judges the IP header, but the processing section as a sending destination of the IP packet (i.e., a processing method of the IP packet) may be determined based on the information described in the IP packet.

Moreover, the IP packet processing section 403 is a processing section which processes the IP packet sent from the IP header judging section 402 and which processes the payload of the IP packet to be sent to itself (to be sent to the GW itself) to send data included in this payload to the data processing section 405. When the data included in the payload includes information to notify a candidate to be connected to the MN 200, the IP packet processing section 403 transmits this data to the MN connection candidate database generating section 406. The hop-by-hop option processing section 404 is a processing section which performs tunneling of the IP packet sent from the IP header judging section 402, processing to add the hop-by-hop option and the like. The data processing section 405 is a processing section which processes the data sent from the IP packet processing section 403. The MN connection candidate database generating section 406 is a processing section which generates a database (an MN connection candidate database) of information (MN connection candidate information) indicating the AR 300 as a candidate to be connected to the MN 200 based on the information sent from the IP packet processing section 403. The IP packet transmitting section 407 is a processing section which transmits the IP packet sent from the IP header judging section 402 and the IP packet processed by the hop-by-hop option processing section 404.

(Preparation of MN Connection Candidate Database in GW 400)

Next, preparation of the MN connection candidate database in the GW 400 will be described. This MN connection candidate information is information including identification information (e.g., a care-of address at the AR 300) which specifies one or a plurality of candidates of the AR 300 potentially connected to the MN 200 during receiving of the IP packet from the CN 500.

Here, a method will be described in which the GW 400 acquires the MN connection candidate information as a basis for preparing the hop-by-hop option based on the information (the neighbor AR information) received from the AR 300. First, each AR 300 generates data indicating the information of the AR 300 itself (e.g., an IP address of the AR 300 itself) in the AR information generating section 307 to send the data to the IP packet transmitting section 309. In consequence, each AR 300 notifies another AR 300 of the information of the AR 300 (the self AR notifying information).

Moreover, when each of the ARs 300 acquires a signal from another AR 300, the IP packet detecting section 301 detects the IP packet to send the packet to the IP header judging section 302. The IP header judging section 302 judges that the IP packet including the AR 300 itself is to be sent to the AR 300 to send the packet to the IP packet processing section 303. The IP packet processing section 303 grasps that the IP packet includes information on the neighbor AR (the information is the self AR notifying information of the neighbor AR 300), and sends the self AR notifying information on the neighbor AR to the neighbor AR information generating section 306. The neighbor AR information generating section 306 receives the self AR notifying information on this neighbor AR to generate the neighbor AR information (a neighbor AR list). In consequence, the ARs 300 can generate a list of the ARs 300 existing in neighbors, respectively.

It is to be noted that a case where the ARs 300 exchange information of the ARs 300 themselves to acquire the neighbor AR information has been described. However, the ARs 300 may retain the information of the ARs neighboring on one another by, for example, an arbitrary method in which the information of the neighbor ARs is retained beforehand in the neighbor AR information generating section 306 of the ARs 300.

As described above, in a case where the MN 200 is connected to the AR 300 in a state in which the information of the neighbor AR is retained in the AR 300, the AR 300 first confirms the connection to the MN 200 in the MN connected state confirming section 308. It is to be noted that as one example of a method of the confirmation, neighbor discovery (ND) may be used in an IPv6. For example, when the MN 200 is connected to a new AR 300, requesting for router advertisement (RA) by transmission of router solicitation (RS) and duplicate address detection (DAD) by transmission of neighbor solicitation (NS) are performed. The AR 300 which has received such a request from the MN 200 detects the IP packet from the MN 200 in the IP packet detecting section 301, judgment is performed by the IP header judging section 302, and the IP packet is sent to the IP packet processing section 303.

At this time, in a case where the information sent from the MN 200 is the RS or the NS, the IP packet processing section 303 sends the information to the MN connected state confirming section 308, and it is confirmed in the MN connected state confirming section 308 that the MN 200 using a specific CoA has been connected. Conversely, when the AR 300 periodically transmits the NS, it may be confirmed whether or not the MN 200 is currently connected to the AR 300 itself. Furthermore, when the MN 200 transmits binding update (BU) based on a mobile IPv6, the AR 300 may confirm the IP packet to establish a relation between the CoA for use in the MN 200 and an HoA of the MN 200.

In a case where it is confirmed by the above processing that the specific MN 200 is connected to the AR 300 itself, the AR 300 may selectively extract information (e.g., the IP address of the AR 300) on the neighbor AR potentially connected to the MN 200 in future from the neighbor AR information retained by the neighbor AR information generating section 306, and form the MN connection candidate information indicating the list of the extracted neighbor ARs and information of the IP address of the MN 200 into the IP packet to transmit the packet from the IP packet transmitting section 309 to the GW 400.

Moreover, here, a method of confirming the presence of the connection of the MN 200 by use of processing in an IP layer has been described, but the presence of the connection of the MN 200 may be confirmed in a lower layer (a physical layer or an MAC layer).

It is to be noted that to select the neighbor AR potentially connected to the MN 200 in future, for example, the AR 300 which manages an area adjacent to an area reached by a radio wave of the AR 300 itself may be selected, or the AR 300 disposed in some area or at a fixed distance from the AR 300 itself may be selected. Information of a movement situation (a movement direction and a movement speed) of the MN 200 may be acquired, and a selection region of the AR 300 may be changed in accordance with a value of the information. That is, the number of the ARs 300 to be selected may be increased in a case where the MN 200 moves at a high speed, and the number of the ARs 300 to be selected may be reduced in a case where the MN 200 moves at a low speed. It is to be noted that as a method in which the AR 300 grasps the movement situation of the MN 200, a plurality of methods such as detection of radio wave fluctuations (the Doppler frequency of phasing), notification of information of the movement situation from the MN 200 and management and calculation of a state of handover between the ARs 300 are considered, but the present invention is not especially limited. Moreover, especially in a case where the ARs 300 are linearly arranged along a predetermined track as shown in FIG. 1, it can be assumed that the MN 200 can only move linearly in one direction. It may be assumed that the selection region of the AR 300 is a region extending along a predetermined track from a predetermined AR 300 (e.g., the AR 300 connected to the MN 200), and the AR 300 disposed in the region may be selected.

As described above, the GW 400 which receives the MN connection candidate information from the AR 300 detects the signal sent from the AR 300 as the IP packet in the IP packet detecting section 401 to send the packet to the IP header judging section 402, and the IP header judging section 402 grasps that the information is to be sent to the GW 400 itself to send the information to the IP packet processing section 403. The IP packet processing section 403 takes the MN connection candidate information of the candidate potentially connected to the MN 200 from the payload of the IP packet, and sends the taken MN connection candidate information to the MN connection candidate database generating section 406. The MN connection candidate database generating section 406 forms a correspondence between each MN 200 and the information (e.g., the care-of address at the AR 300) on the candidate of the AR 300 to be connected to each MN 200 into a database from the received MN connection candidate information. In consequence, the GW 400 may acquire the MN connection candidate information indicating the AR 300 potentially connected to the specific MN 200 in future, and prepare the MN connection candidate database.

It is to be noted that a method in which the GW 400 acquires the MN connection candidate information is not limited to the above-mentioned method, and another arbitrary method may be used. For example, examples other than the above-mentioned method include a method in which, in a case where it is notified by the specific AR 300 that the MN 200 has been connected, the GW 400 predicts the AR 300 as a movement destination to which the MN 200 moves from the specific AR 300, and a result of the prediction is regarded as the MN connection candidate information.

Moreover, especially in a case where configuration of the movement of the MN 200 is limited as in a case where the MN 200 is arranged in a mobile member which moves along an only predetermined track, a case where the movement direction of the mobile member can be grasped or the like, if the AR 300 connected to the MN 200 is grasped at a certain point of time, the AR 300 as a future movement destination of the MN 200 is easily predicted, and the AR 300 to be described in the MN connection candidate information can be limited. In this case, it is possible to limit the AR 300 as the connection destination of the MN 200 further with reference to a speed of the mobile member (a speed of the movement of the MN 200), a time schedule of the mobile member (e.g., a timetable in a case where the mobile member is a train) and the like. In the above-mentioned case, when the ARs 300 are arranged along the predetermined track, a relation between the arrangement of the ARs 300 and the movement direction of the MN 200 is overlooked beforehand. Therefore, processing such as exchanging of the information between the ARs 300 (exchanging of the self AR notifying information) can be reduced. Alternatively, without exchanging the information itself, the AR 300 or the GW 400 may be configured to grasp a network constitution of the whole communication system 100 beforehand.

(Transfer of IP Packet from CN 500 to MN 200)

Next, an operation of the communication system in a case where the IP packet is transferred from the CN 500 to the MN 200 will be described. It is to be noted that a flow of the IP packet in the whole communication system will be described with reference to a sequence chart shown in FIG. 6 (steps S1100s). Moreover, details of processing of the GW 400 and the AR 300 will be described with reference to flow charts (steps S1400s, S1300s) shown in FIGS. 7 and 8.

According to the first embodiment of the present invention, it is constituted that the GW 400 designates one or a plurality of ARs 300 which could be the connected destination of the MN 200. First, the GW 400 needs to prepare the MN connection candidate database concerned with the MN 200. For example, when the MN 200 is connected to the AR₁ 300-1 (step S1101 of FIG. 6), the AR₁ 300-1 generates the MN connection candidate information to notify the GW 400 of the information (step S1103 of FIG. 6). The GW 400 prepares the MN connection candidate database concerned with the specific MN 200 based on the MN connection candidate information from the AR₁ 300-1 (step S1105 of FIG. 6). It is to be noted that the processing up to this step S1105 is performed by processing concerned with the preparation of the above-mentioned MN connection candidate database.

Figure 6:
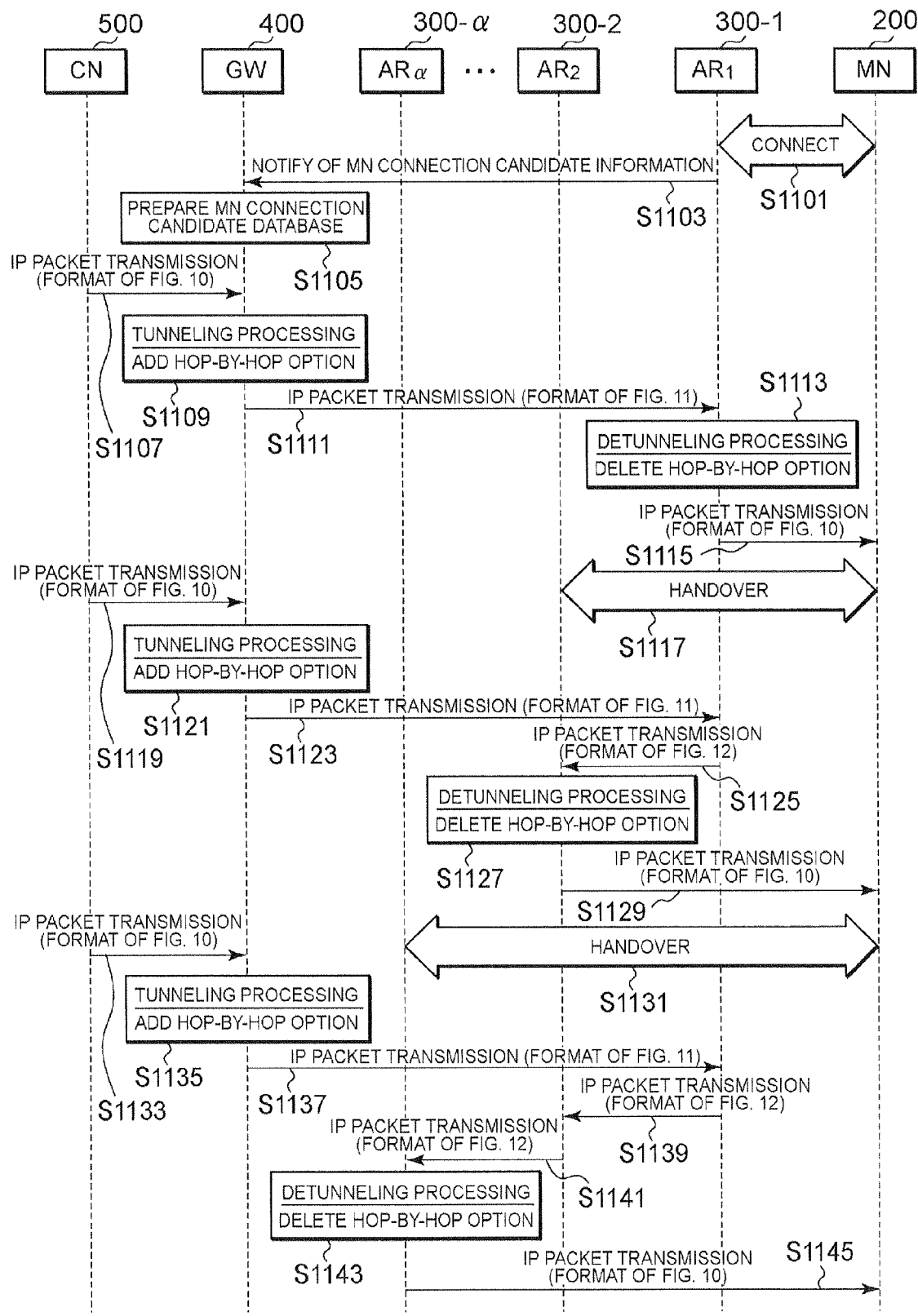
FIG. 6 is a sequence chart showing an operation of the whole communication system according to the first embodiment of the present invention.
Figure 7:
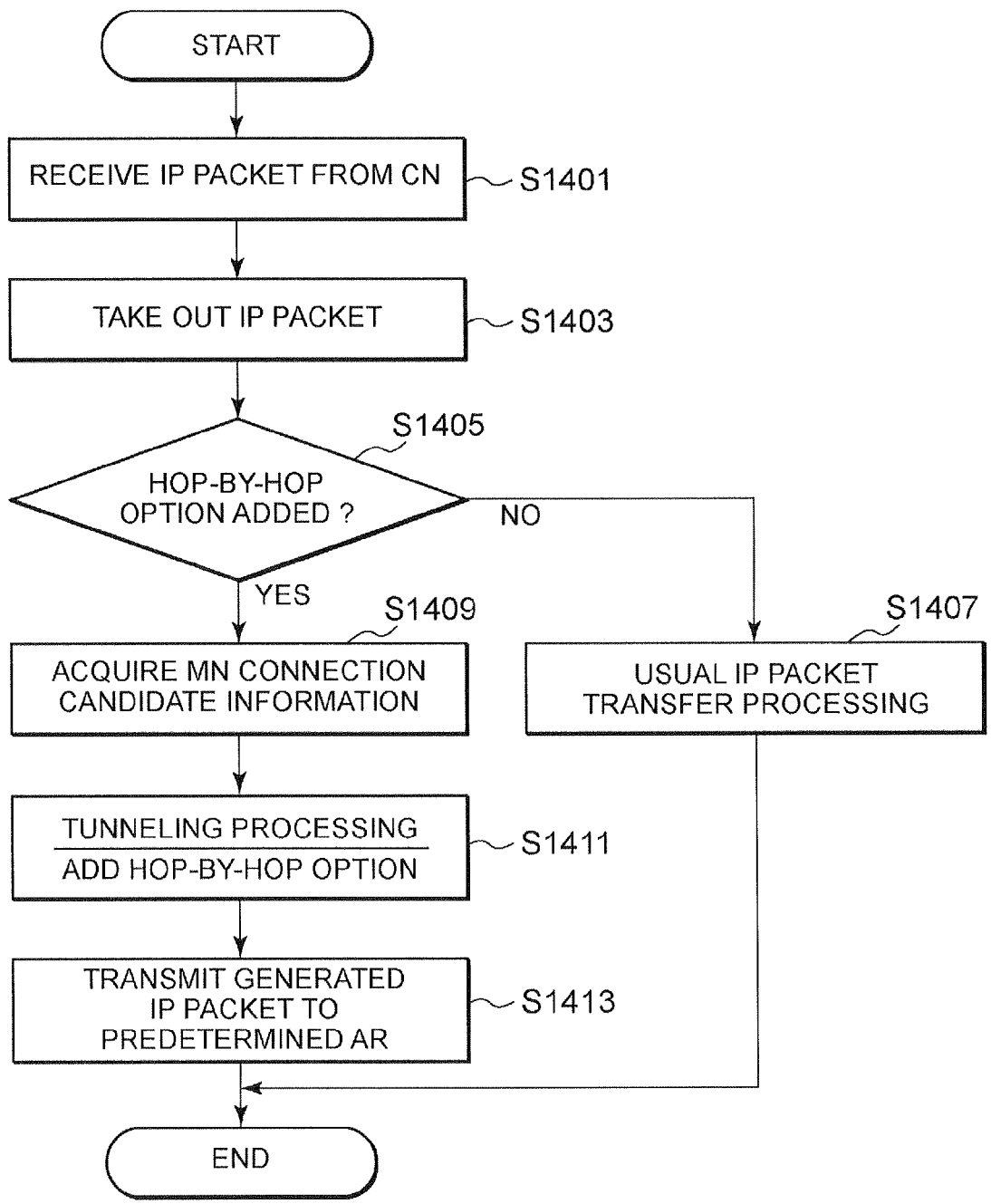
FIG. 7 is a flow chart showing details of processing of the GW according to the first embodiment of the present invention.

When the CN 500 transmits the IP packet to be sent to the MN 200, the IP packet to be sent to the MN 200 is transmitted by the CN 500 and first input into the GW 400 through the network 600 (step S1107 of FIG. 6, step S1401 of FIG. 7). As a format of the IP packet transmitted from this CN 500 to the GW 400, a packet format of a usual IPv6 shown in FIG. 9 or a packet format of a usual mobile IPv6 shown in FIG. 10 is used. It is to be noted that in the following description, it is assumed that the mobile IPv6 shown in FIG. 10 is used. However, the mobile IPv6 is not essentially used, and a packet format of another arbitrary protocol may be used.

The GW 400 takes out a signal sent from the CN 500 as the IP packet in the IP packet detecting section 401 to output the packet to the IP header judging section 402 (step S1403 of FIG. 7). The IP header judging section 402 judges whether or not to add the hop-by-hop option based on information such as the destination address described in the IP header and a home address option (step S1405 of FIG. 7). To add the hop-by-hop option, the option is sent to the hop-by-hop option processing section 404. It is to be noted that, in a case where the hop-by-hop option is not added, usual IP packet transfer processing is performed (step S1407 of FIG. 7).

The hop-by-hop option processing section 404 which has received the IP packet from the IP header judging section 402 inquire the MN connection candidate database generating section 406 of information of the candidate of the AR 300 to be connected to the MN 200 by use of information of a home address of the MN 200 as a keyword, and acquires the MN connection candidate information in which the AR 300 potentially connected to the MN 200 currently is described (step S1409 of FIG. 7). It is to be noted that here, as the AR 300 potentially connected to the MN 200 currently, k ARs 300 (the AR₁ 300-1 to the AR$_k$ 300-k) are selected. It is also assumed that the MN connection candidate information includes identification information (e.g., the care-of addresses) at the AR₁ 300-1 to the AR$_k$ 300-k, respectively.

The hop-by-hop option processing section 404 subjects the IP packet to tunneling processing with respect to the AR 300 which is supposed to be connected to the MN 200 currently (the AR 300 supposed to have the highest possibility that the MN 200 is currently connected thereto) (it is here assumed that the access router is the AR₁ 300-1). Moreover, among the ARs 300 included in the MN connection candidate information, the IP addresses of the ARs 300 (here the AR₂ 300-2 to the AR$_k$ 300-k) other than the AR₁ 300-1 supposed to be currently connected are added as the hop-by-hop options (step S1109 of FIG. 6, step S1411 of FIG. 7). In the following, the IP packet transmitted from the CN 500 which is included in the tunneled IP packet is sometimes referred to as the original IP packet.

It is to be noted that the IP addresses of the AR₂ 300-2 to the AR$_k$ 300-k added as the hop-by-hop options indicate the AR₂ 300-2 to the AR$_k$ 300-k as transfer descriptions to which the IP packet is to be successively transferred. For example, a rule is determined so that the IP packet is transferred to the AR₂ 300-2 to the AR$_k$ 300-k in order as described in the hop-by-hop options. In consequence, when the IP addresses of the AR₂ 300-2 to the AR$_k$ 300-k as the transfer destinations are added, priorities concerned with the transfer may be set.

Figure 11:
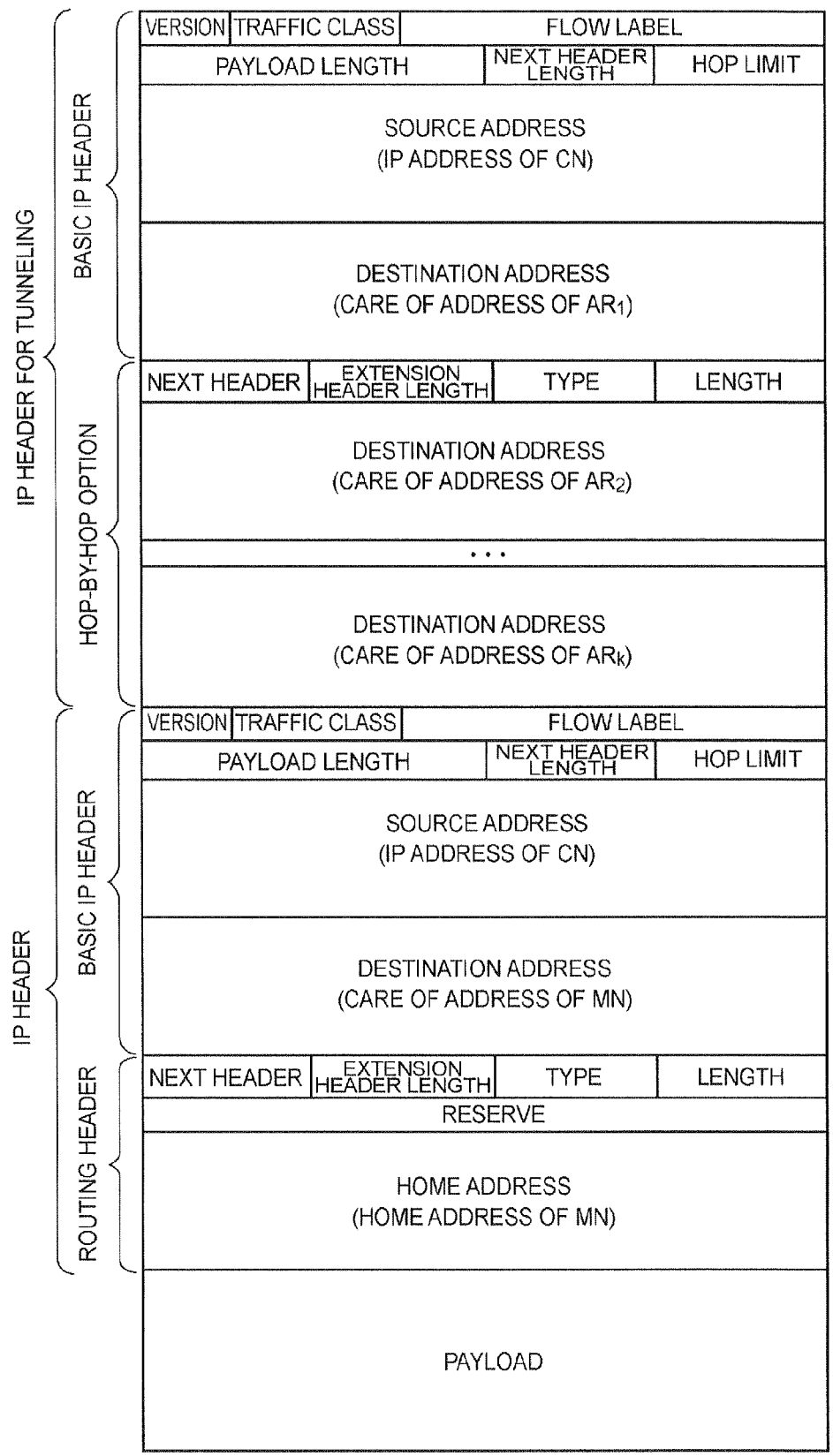
FIG. 11 is a diagram showing one example of a packet format of an IP packet to be transmitted from a GW 400 to an $AR_1$ 300-1 according to the first embodiment of the present invention.

As a result of the tunneling and the adding of the hop-by-hop option performed by the hop-by-hop option processing section 404, the IP packet having a packet format shown in FIG. 11 is generated. This IP packet having the packet format shown in FIG. 11 is sent to the IP packet transmitting section 407, and is transmitted from the GW 400 to the AR₁ 300-1 (step S1111 of FIG. 6, step S1413 of FIG. 7).

The AR₁ 300-1 receives a signal concerned with the IP packet sent from the GW 400 (step S1301 of FIG. 8), and takes out the signal as the IP packet in the IP packet detecting section 301 (step S1303 of FIG. 8) to output the packet to the IP header judging section 302. The IP header judging section 302 detects that the received IP packet is to be transmitted to the AR₁ 300-1 itself and that the hop-by-hop option is added to the packet (step S1305 of FIG. 8), and sends this IP packet to the hop-by-hop option processing section 304.

Figure 8:
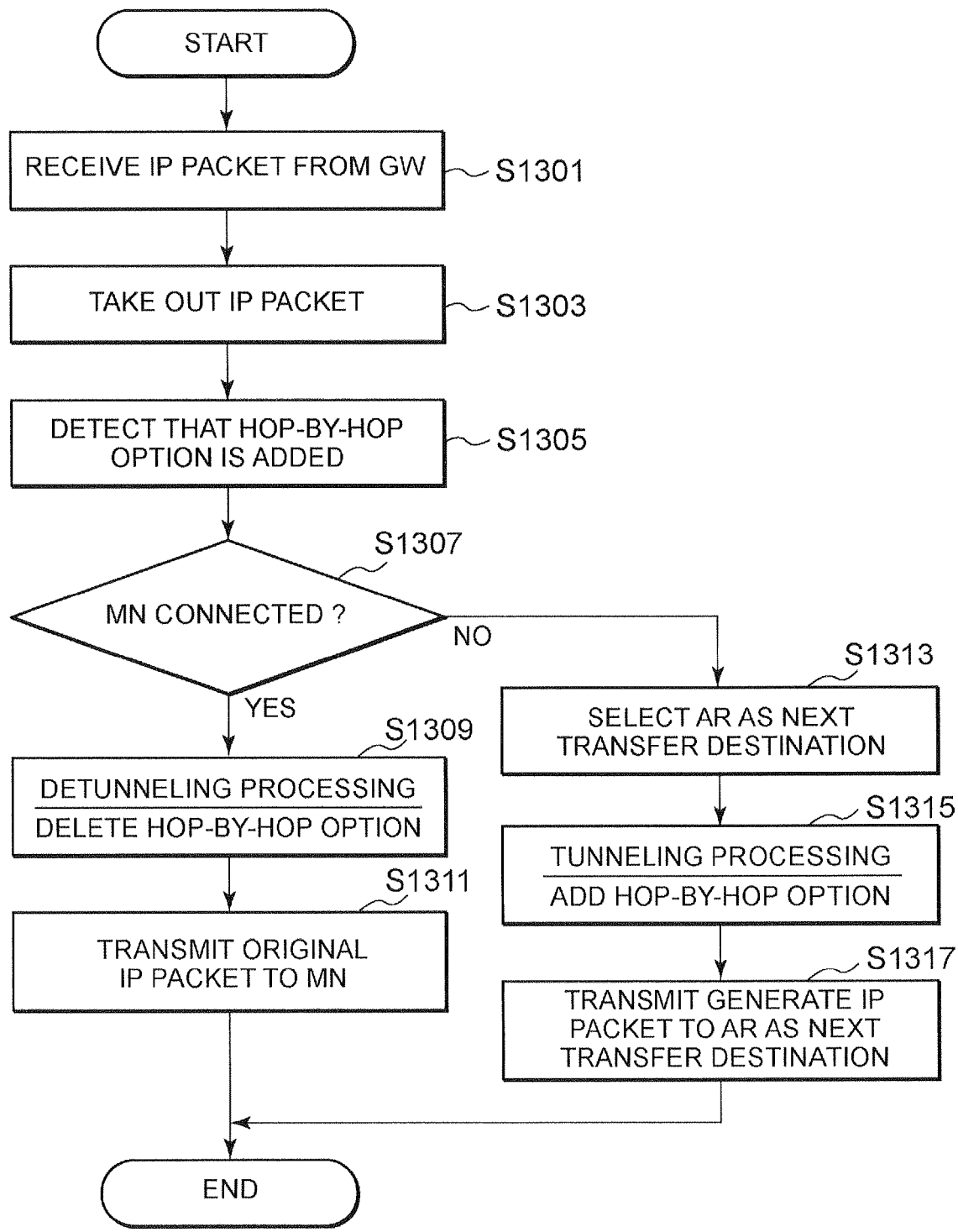
FIG. 8 is a flow chart showing details of processing of the AR according to the first embodiment of the present invention.

The hop-by-hop option processing section 304 allows the MN connected state confirming section 308 to confirm whether or not the corresponding MN 200 is connected to the AR₁ 300-1 itself by use of information such as the destination address of the original IP packet included in the tunneled IP packet or the home address of a routing header for identifying the MN 200 (step S1307 of FIG. 8).

Moreover, in a case where it is confirmed by the MN connected state confirming section 308 that the MN 200 is currently connected to the AR₁ 300-1 itself, the tunneled IP packet is detunneled, and the hop-by-hop option is deleted (step S1113 of FIG. 6, step S1309 of FIG. 8) to send the packet to the IP packet transmitting section 309. As a result, the AR₁ 300-1 transmits the IP packet to the MN 200 (step S1115 of FIG. 6, step S1311 of FIG. 8). At this time, the IP packet transmitted from the AR₁ 300-1 to the MN 200 is the original IP packet transmitted from the CN 500, and has a packet format of the original IP packet shown in FIG. 9 or 10.

On the other hand, in a case where it is seen by the confirmation of the MN connected state confirming section 308 that, for example, the MN 200 corresponding to a CoA₁ (the CoA of the MN 200 for use during connection to the AR₁ 300-1) included in the original IP packet has already performed handover to another AR 300 (e.g., the AR₂ 300-2) (step S1117 of FIG. 6) and that the MN is not currently connected to the AR₁ 300-1 itself, the hop-by-hop option processing section 304 reconstructs the tunneled IP packet. It is to be noted that the CoA of the MN 200 for use during the connection to the AR 300-$i$ will hereinafter be referred to as the CoA$_1$.

Specifically, with respect to the IP packet transmitted from the CN 500 via the GW 400 (steps S1119 to S1123 of FIG. 6), the AR$_1$ 300-1 selects one AR from the AR$_2$ 300-2 to the AR$_k$ 300-$k$ included in the hop-by-hop option as the AR as the next transfer destination (e.g., the AR$_2$ 300-2 described at a top of the hop-by-hop option and having the highest priority is selected) (step S1313 of FIG. 8). This AR$_2$ 300-2 is tunneled. Moreover, the hop-by-hop option from which the IP address of the selected AR$_2$ 300-2 has been eliminated is added (step S1315 of FIG. 8). It is to be noted that this reconstruction processing of the IP packet is simple processing to replace a transmission destination address of the transmitted IP packet with the selected address, and the sent IP packet can be reused.

Figure 12:
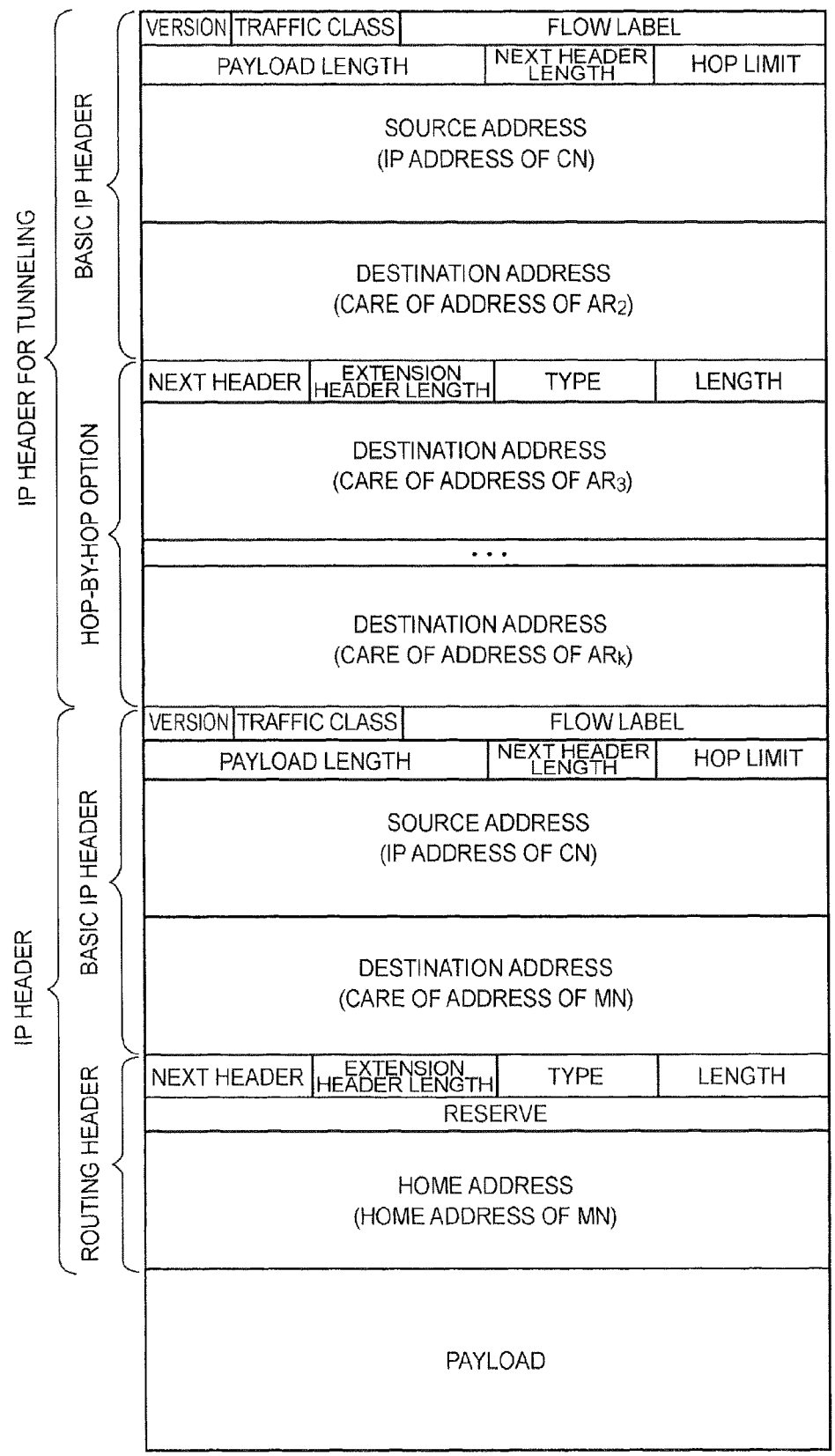
FIG. 12 is a diagram showing one example of a packet format of an IP packet to be transmitted from the $AR_1$ 300-1 to an $AR_2$ 300-2 according to the first embodiment of the present invention.

As a result, as shown in FIG. 12, the IP packet is generated which has a tunneling header set to the destination of the AR$_2$ 300-2 and the IP addresses of the AR$_3$ 300-3 to the AR$_k$ 300-$k$ are added as the hop-by-hop options. The IP packet having the packet format shown in FIG. 12 is sent to the IP packet transmitting section 309 and transmitted from the AR$_1$ 300-1 to the AR$_2$ 300-2 (step S1125 of FIG. 6, step S1317 of FIG. 8).

When the AR$_2$ 300-2 receives this IP packet transmitted from the AR$_1$ 300-1, processing similar to that of the AR$_1$ 300-1 described above is basically performed. That is, it is confirmed whether or not the corresponding MN 200 is connected to the AR$_2$ 300-2 itself. When the MN 200 is connected to the AR$_2$ 300-2 itself, the IP packet is detunneled (and the hop-by-hop option is deleted) (step S1127 of FIG. 6), and the original IP packet is transmitted to the MN 200 (step S1129 of FIG. 6).

On the other hand, when the MN 200 is not connected to the AR$_2$ 300-2 itself, the AR$_2$ 300-2 performs processing similar to that of the transfer of the IP packet from the AR$_1$ 300-1 to the AR$_2$ 300-2 described above, and transmits the tunneled IP packet to the AR (e.g., the AR$_3$ 300-3) as the next transfer destination designated by the hop-by-hop option.

Moreover, when the MN 200 further performs the handover (step S1131 of FIG. 6) and the connected destination is changed to the AR$_\alpha$ 300-$\alpha$ ($\alpha$ is an arbitrary value of $1 \leq \alpha \leq k$), the similar processing is performed. That is, while the connection to the MN 200 is confirmed with respect to the IP packet transmitted from the CN 500 via the GW 400 (steps S1133 to S1137 of FIG. 6), the AR 300 successively transfers the IP packet so as to follow the movement (the handover) of the MN 200 (steps S1139, S1141). Finally, it can be constituted that the AR$_\alpha$ 300-$\alpha$ connected to the MN 200 detunnels the IP packet, deletes the hop-by-hop option (step S1143 of FIG. 6), and transmits the original IP packet to the MN 200 (step S1145 of FIG. 6).

In addition, the original IP packet is finally transferred to the MN 200 from the AR (the AR$_\alpha$ 300-$\alpha$) connected to the MN 200 at a time when the IP packet arrives. Therefore, the AR 300 sometimes needs to perform processing which differs with a case where $\alpha=1$ and a case where $\alpha \neq 1$.

For example, when the MN 200 is connected to the AR$_1$ 300-1 ($\alpha=1$) and the CoA$_1$ of the MN 200 included in the original IP packet is used, a correspondence with respect to the CoA$_1$ of the MN 200 designated at the destination of the original IP packet is clarified. The AR$_1$ 300-1 confirms a connected state of the MN 200. Moreover, when the MN 200 exists under the AR, it is easy to transmit the original IP packet to the MN 200. However, in a case where the MN 200 moves to the AR other than the AR$_1$ 300-1, for example, one of the AR$_2$ 300-2 to the AR$_k$ 300-$k$ and the CoA (one of CoA$_2$ to CoA$_k$) different from the CoA$_1$ of the MN 200 included in the original IP packet is used, a problem occurs that the AR$_2$ 300-2 to the AR$_k$ 300-$k$ cannot grasp whether or not the MN 200 is connected thereunder only with reference to the CoA$_1$ designated at the destination of the original IP packet.

To solve the above-mentioned problem, for example, the MN 200 may be constituted so that the AR$_2$ 300-2 to the AR$_k$ 300-$k$ can acquire, by use of RS/NS or BU transmitted from the connected MN 200, a relation between the CoA$_2$ to the CoA$_k$ for use in the MN 200 under the AR$_2$ 300-2 to AR$_k$ 300-$k$ and the HoA of the MN 200. In consequence, the AR 300 can derive the CoA$_2$ to the CoA$_k$ of the MN 200 corresponding to the HoA from the HoA included in the received IP packet, and the connected state of the MN 200 can be confirmed. For example, when the AR 300 notifies the neighbor AR 300 (the AR 300 described in the MN connection candidate information) of Layer 2 address (a link layer address) of the MN 200 together with the CoA and the HoA of the MN 200, the neighbor AR 300 can perform the confirmation of the connected state of the MN 200 and the like.

It is to be noted that, in a case where it is considered that the original IP packet be transferred to the MN 200 from the AR$_2$ 300-2 to the AR$_k$ 300-$k$, for example, it is preferable that the MN 200 is provided with a receiving function of the CoA (specifically, the CoA$_1$ designated at the destination of the original IP packet) used in the past and that the AR$_2$ 300-2 to the AR$_k$ 300-$k$ are provided with a function of converting the destination address of the original IP packet into the CoA (CoA$_2$ to CoA$_k$) currently used by the MN 200 to transmit, to the MN 200, the IP packet constituted by changing the destination address to the CoA of the MN 200 at present.

Moreover, for example, in a case where it is detected that a predetermined time has elapsed after the connected state of the AR 300 to the MN 200 changed to a non-connected state (e.g., the predetermined time has elapsed after the handover to another AR 300 was performed), the GW 400 may be requested to exclude the AR from the AR candidates of the MN connection candidate database. In a case where the MN 200 is newly connected, the AR 300 having a function of providing new MN connection candidate information with respect to the GW 400 may be determined. Alternatively, the GW 400 may transmit a transmission request of the new MN connection candidate information to the AR 300. In consequence, when the MN 200 moves, the MN connection candidate database to be stored in the AR 300 can be updated.

Furthermore, according to a configuration of the first embodiment described above, the AR 300 currently connected to the MN 200 is searched by use of the identification information of the AR 300 (e.g., the care-of address at the AR 300). However, instead of the identification information of the AR 300, for example, the CoA to be assigned in a case where the MN 200 is connected to each AR 300 may be used. In this case, in the MN connection candidate information, a list of the CoAs of the MN 200 assigned to the MN 200 in the AR$_1$ 300-1 to the AR$_k$ 300-$k$ potentially currently connected to the MN 200 is described. It is to be noted that, in this case, the GW 400 needs to grasp beforehand the CoA$_1$ to the CoA$_k$ to be assigned to the MN 200. For example, it is preferable that the AR$_2$ 300-2 to the AR$_k$ 300-$k$ determine the CoA$_2$ to the CoA$_k$ to be assigned to the MN 200 at a time when the MN 200 is connected to the AR$_1$ 300-1.

In addition, according to a configuration of the first embodiment described above, it is constituted that the GW 400 adds the tunneling header and the hop-by-hop option to the IP packet and that the AR 300 connected to the MN 200 deletes the tunneling header and the hop-by-hop option. According to this constitution, a route for searching for the MN 200 (e.g., for following the movement of the MN 200) can be set, but another route setting method may be adopted.

Figure 13:
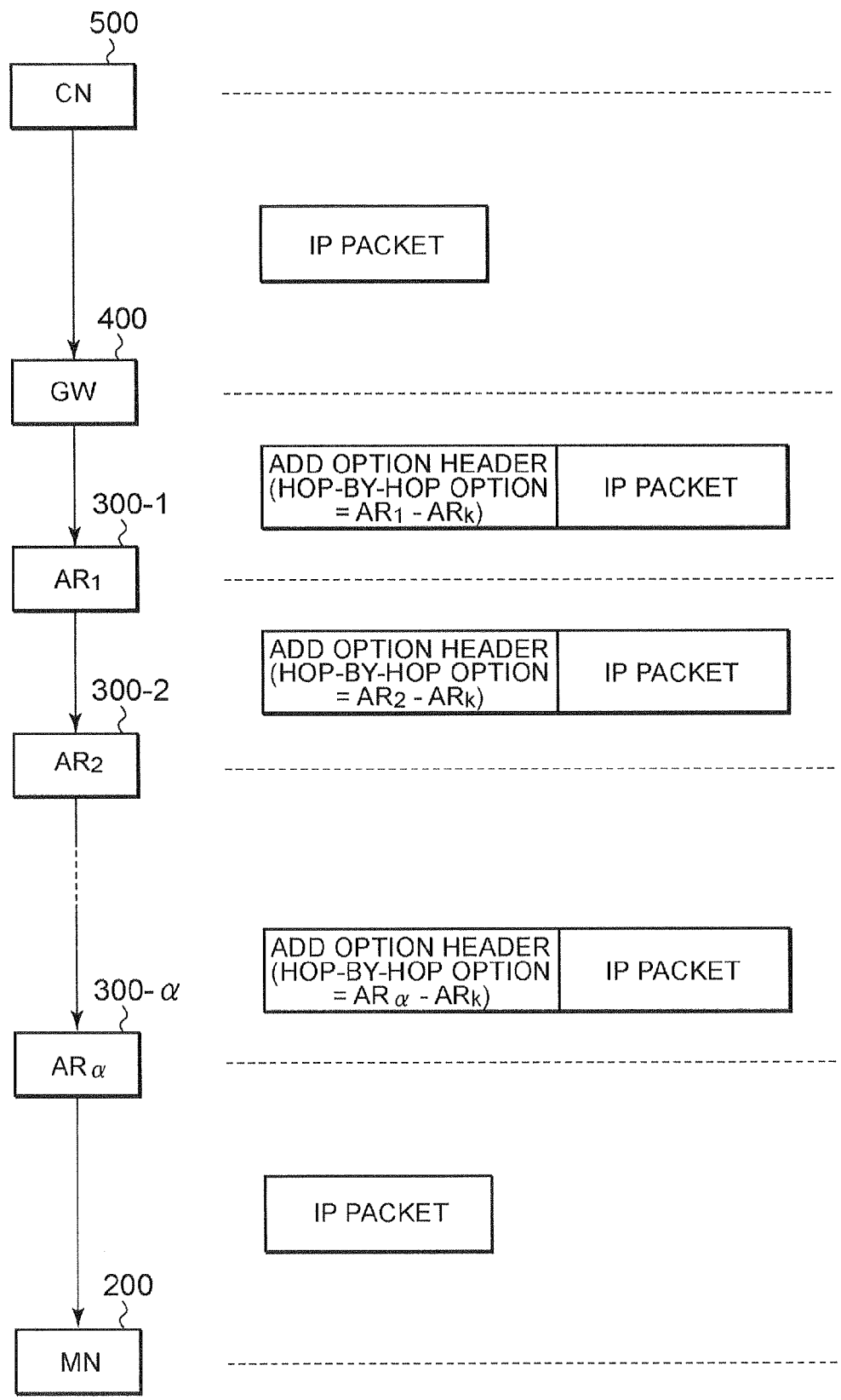
FIG. 13 is a diagram schematically showing another example of the packet to be transmitted according to the first embodiment of the present invention.
Figure 14:
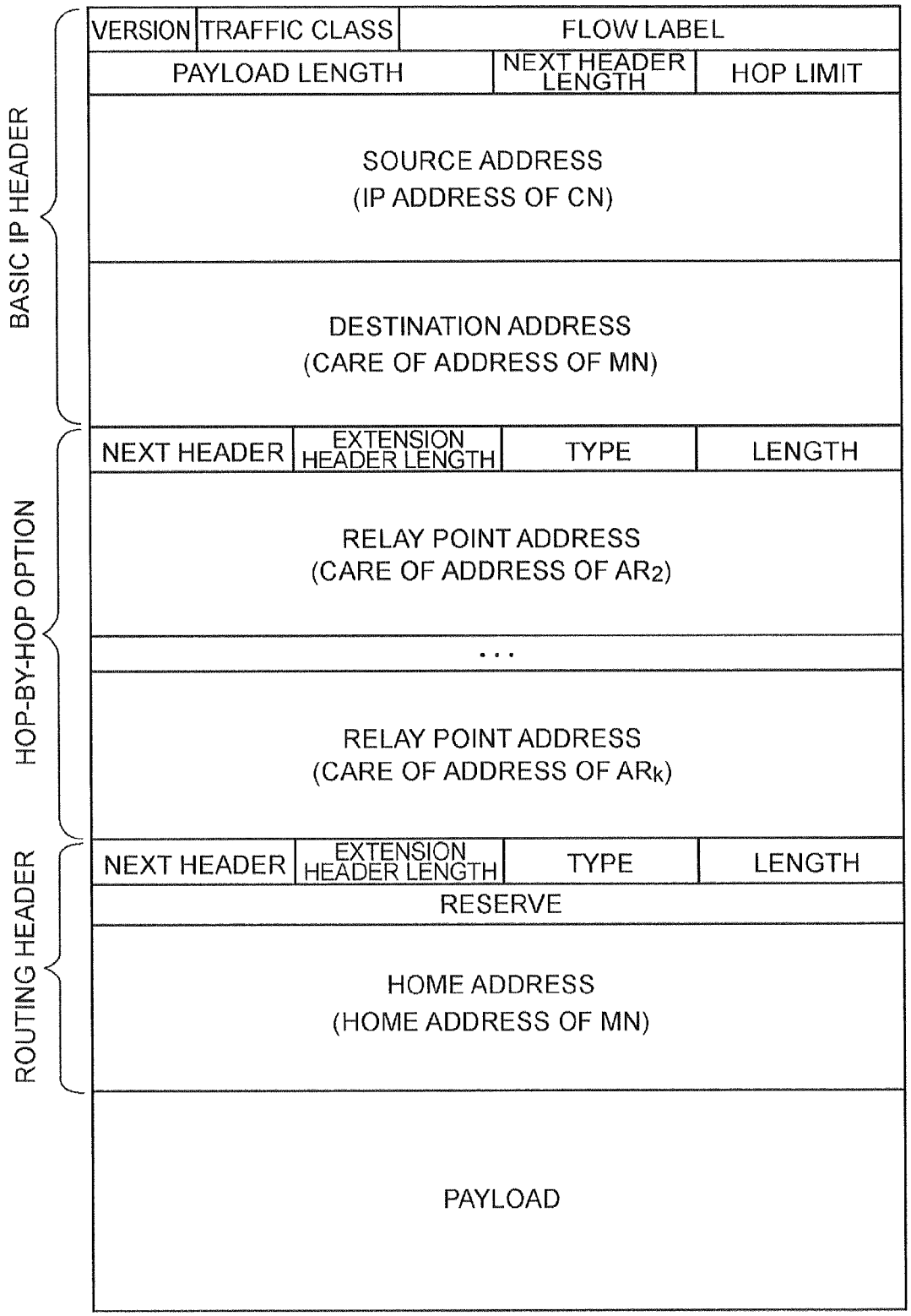
FIG. 14 is a diagram showing another example of a packet format of an IP packet to be transmitted from the GW 400 to the $AR_1$ 300-1 according to the first embodiment of the present invention.

Examples of the other route setting method include a method in which, as shown in FIG. 13, the GW 400 does not add any tunneling header but directly inserts the hop-by-hop option into the IP packet (see a format of FIG. 14), the IP packet of this packet format is transferred between the ARs 300, and the AR 300 connected to the MN 200 deletes this hop-by-hop option. It is to be noted that according to this method, the GW 400 does not perform the tunneling processing in the steps S1109, S1121 and S1135 of FIG. 6, and the detunneling processing is not performed in the steps S1113, S1127 and S1143 of FIG. 6.

Second Embodiment

Figure 15:
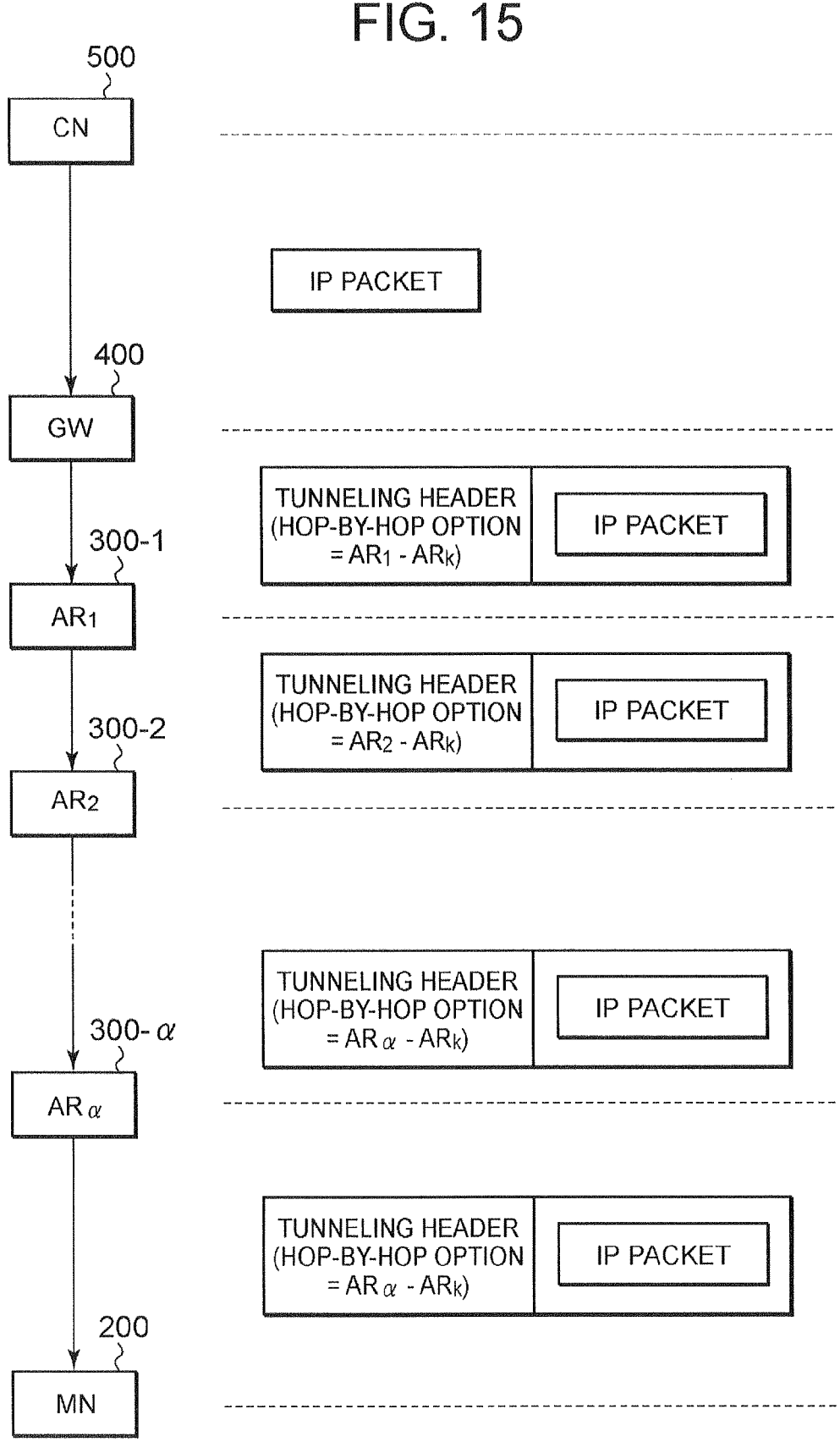
FIG. 15 is a diagram schematically showing one example of a packet to be transmitted according to a second embodiment of the present invention.

Next, a second embodiment of the present invention will be described. According to this second embodiment, in the same manner as in the first embodiment described above, a GW 400 subjects a packet transmitted from a CN 500 to an MN 200 to packet tunneling, and adds information on an AR 300 potentially connected to the MN 200, and an IP packet is transferred between the ARs 300 based on this information. A case where the MN 200 finally receives the IP packet to which a tunneling header has been added and the MN 200 itself deletes the tunneling header will be described with reference to, for example, FIG. 15.

The same CN 500 and GW 400 as those of the first embodiment described above may be used in this second embodiment. On the other hand, the AR 300 and the MN 200 are constituted so that a packet tunneling header deleting function provided at the AR 300 in the first embodiment (specifically, a function of a hop-by-hop option processing section 304 for deleting the tunneling header and a hop-by-hop option in a case where the packet is transmitted to the MN 200) is provided at the MN 200 in the second embodiment.

That is, in this second embodiment, as the AR 300 and the MN 200, the AR 300 constituted by deleting the tunneling header deleting function from the hop-by-hop option processing section 304 of the AR 300 shown in FIG. 4 may be used, and the MN 200 including a hop-by-hop option processing section having a function for deleting this tunneling header and the hop-by-hop option in a case where the tunneling header is added to the IP packet output from an IP packet processing section 202 of the MN 200 shown in FIG. 3 may be used.

Next, an operation of the second embodiment of the present invention will be described with reference to FIG. 6. In the second embodiment of the present invention, preparation of an MN connection candidate database by the GW 400, transmission of the IP packet from the CN 500 to the GW 400, processing in the GW 400 and the transfer of the IP packet between the ARs 300 are the same as those of the first embodiment.

On the other hand, the AR 300 connected to the MN 200 as a destination (a transmission destination) of the IP packet at a time when the IP packet is received transfers, to the MN 200, the IP packet having a format (a format of FIG. 11) as it is. That is, in this second embodiment, in the sequence chart shown in FIG. 6, the processing in the steps S1113, S1127 and S1143 is not performed, and the IP packet having the format of FIG. 11 is transmitted from the AR 300 to the MN 200 in the steps S1115, S1129 and S1145.

Moreover, in the steps S1115, S1129 and S1145 of FIG. 6, the MN 200 which has received the IP packet having the format of FIG. 11 confirms that the IP packet is to be sent to itself. Through processing such as the deletion of the tunneling header and the hop-by-hop option, the MN can take out data included in a payload of the IP packet to process the data included in the IP packet.

Even in this second embodiment, in the same manner as in the first embodiment described above, as MN connection candidate information, a CoA of the MN 200 may be used instead of an IP address of the AR 300, or an MN connection candidate database may appropriately be updated.

Moreover, according to a configuration of the second embodiment described above, it is constituted that the GW 400 adds the tunneling header and the hop-by-hop option to the IP packet and that the MN 200 deletes the tunneling header and the hop-by-hop option. According to this constitution, a route for searching for the MN 200 (e.g., for following the movement of the MN 200) can be set, but another route setting method may be adopted in the same manner as in the first embodiment described above.

Figure 16:
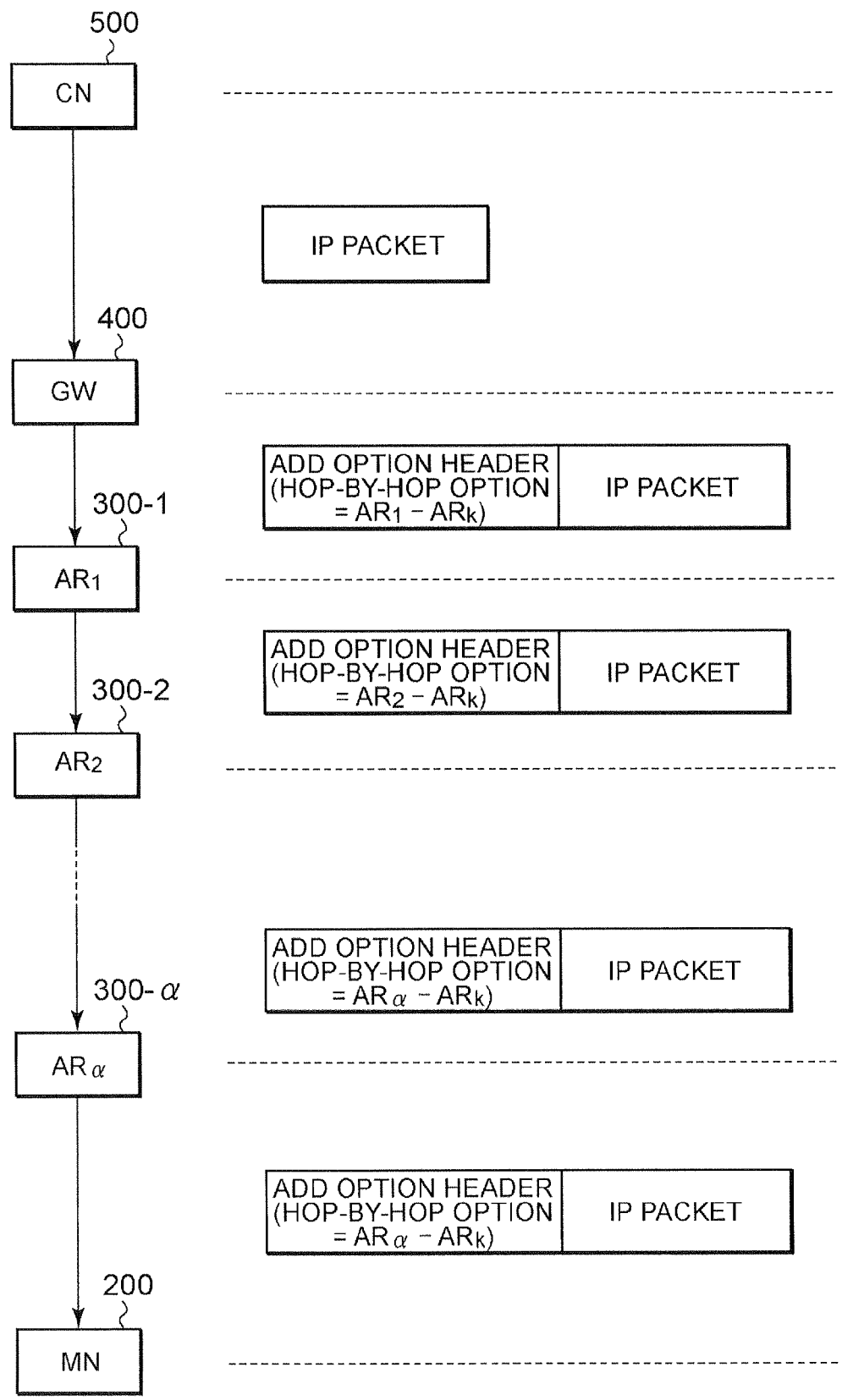
FIG. 16 is a diagram schematically showing another example of the packet to be transmitted according to the second embodiment of the present invention.

Examples of the other route setting method include a method in which, as shown in FIG. 16, the GW 400 does not add any tunneling header but directly inserts the hop-by-hop option into the packet (see a format of FIG. 14), the IP packet having this packet format is transferred between the ARs 300, and the MN 200 deletes this hop-by-hop option. It is to be noted that according to this method, the GW 400 does not perform the tunneling processing in the steps S1109, S1121 and S1135 of FIG. 6, and the detunneling processing is not performed by the MN 200 which has received the IP packet.

Third Embodiment

Figure 17:
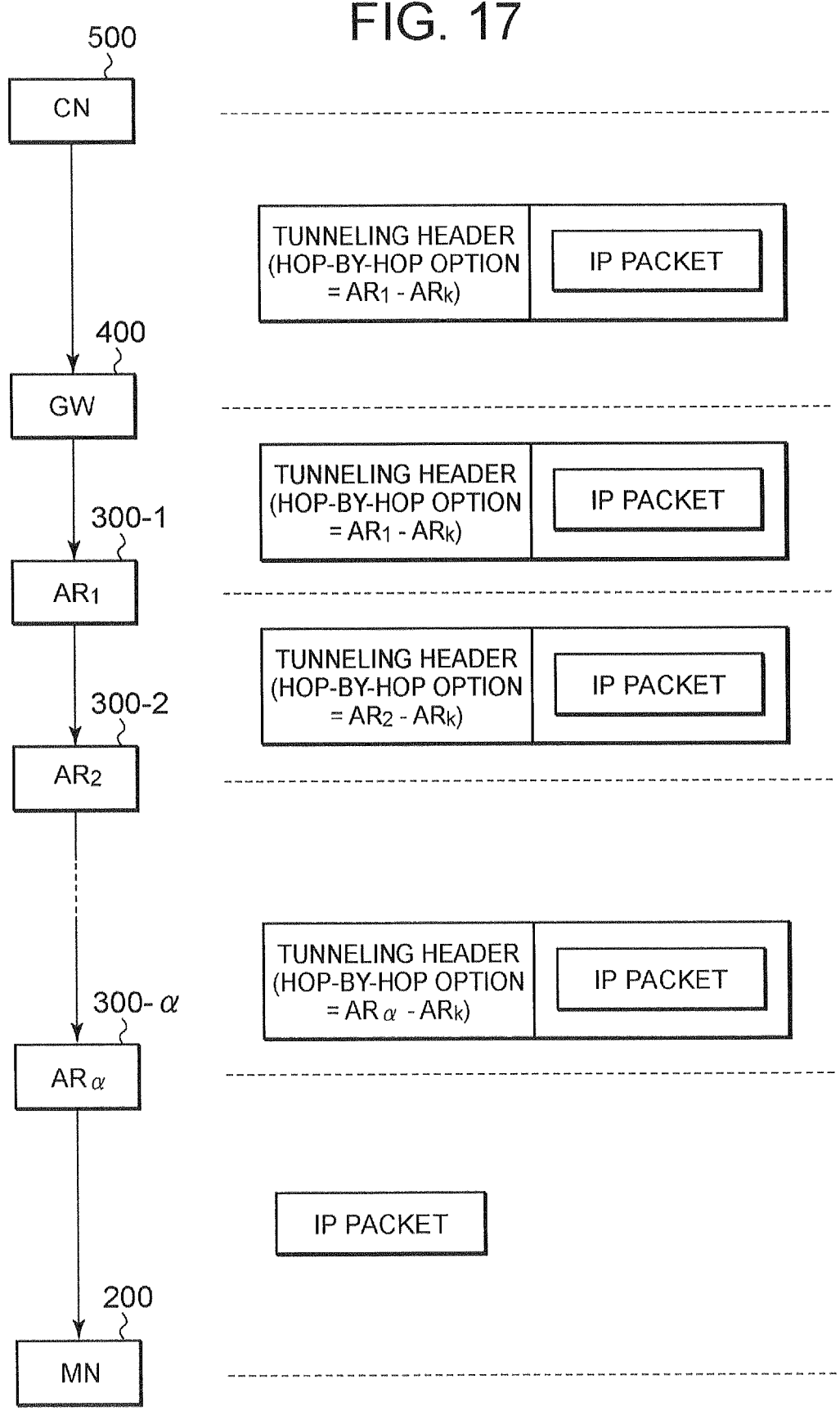
FIG. 17 is a diagram schematically showing one example of a packet to be transmitted according to a third embodiment of the present invention.

Next, a third embodiment of the present invention will be described. In this third embodiment, a case where, for example, as shown in FIG. 17, when a CN 500 transmits an IP packet to be sent to an MN 200, packet tunneling is performed, the IP packet to which information on an AR 300 potentially connected to the MN 200 has been added is transmitted, the IP packet is transferred between the ARs 300 based on this information and the MN 200 finally receives the IP packet from the AR 300 as a connected destination will be described.

In this third embodiment, since the CN 500 tunnels the IP packet, the CN 500 has a function of acquiring and storing MN connection candidate information indicating the AR 300 potentially connected to the MN 200 and adding identification information included in the MN connection candidate information to the IP packet.

Figure 18:
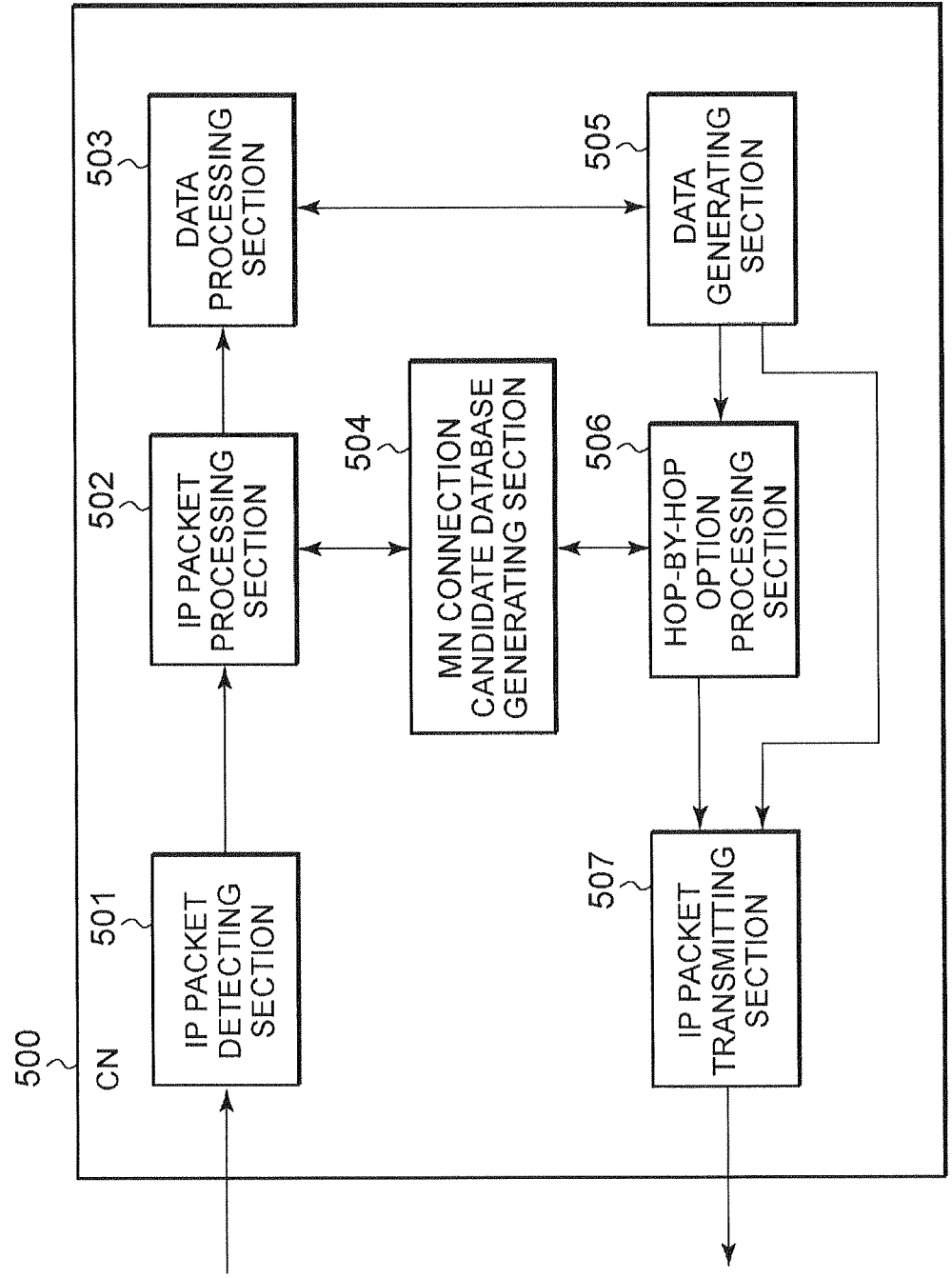
FIG. 18 is a diagram showing a constitution of a CN according to the third embodiment of the present invention.

FIG. 18 is a diagram showing a constitution of the CN according to the third embodiment of the present invention. The CN 500 shown in FIG. 18 has an IP packet detecting section 501, an IP packet processing section 502, a data processing section 503, an MN connection candidate database generating section 504, a data generating section 505, a hop-by-hop option processing section 506 and an IP packet transmitting section 507.

The IP packet detecting section 501 is a processing section which detects the IP packet from a signal received by the CN 500 to take out the IP packet. The IP packet processing section 502 is a processing section which processes the IP packet taken by the IP packet detecting section 501. The IP packet processing section 502 has a function of processing a payload of the IP packet to be sent to itself (to be sent to the CN 500 itself) to send data included in this payload to the data processing section 503. When the data included in the payload includes information to notify a candidate to be connected to the MN 200, the IP packet processing section 502 transmits this data to the MN connection candidate database generating section 504.

Moreover, the data processing section 503 is a processing section which processes the data sent from the IP packet processing section 502. The MN connection candidate database generating section 504 is a processing section which generates a database (an MN connection candidate database) of information (MN connection candidate information) indicating the AR 300 as a candidate to be connected to the MN 200 based on the information sent from the IP packet processing section 502.

Furthermore, the data generating section 505 is a processing section which generates data to be transmitted by the CN 500. It is to be noted that in the data generated by the data generating section 505, data to be transmitted to the MN 200 by use of the present invention is sent to the hop-by-hop option processing section 506, and another data is sent to the IP packet transmitting section 507. The IP packet transmitting section 507 is a processing section which transmits the data generated by the data generating section 505 and the IP packet processed by the hop-by-hop option processing section 506.

In addition, the hop-by-hop option processing section 506 is a processing section which subjects the data received from the data generating section 505 to tunneling of the IP packet, addition processing of a hop-by-hop option and the like. It is to be noted that, at this time, the hop-by-hop option processing section 506 processes the IP packet to be transmitted to the MN 200 with reference to the MN connection candidate information on the MN 200 prepared by the MN connection candidate database generating section 504 so that the MN 200 can transmit the packet transferred between the ARs 300. Here, in the same manner as in the GW 400 of the first embodiment described above, for example, the IP packet to be sent to the MN 200 is subjected to the tunneling processing with respect to the AR 300 supposed to be currently connected to the MN 200 (the AR 300 having the highest possibility of being currently connected to the MN 200). Among the ARs 300 included in the MN connection candidate information, an IP address of the AR 300 other than an $AR_1$ 300-1 supposed to be currently connected is added as the hop-by-hop option.

On the other hand, unlike the first embodiment described above, the GW 400 of the third embodiment of the present invention does not have to have a function of adding the information to the packet based on the MN connection candidate information, and does not have to necessarily understand the hop-by-hop option. For example, as the GW 400 of the third embodiment of the present invention, the GW 400 having a conventional constitution may be used.

Next, an operation according to the third embodiment of the present invention will be described. In the third embodiment of the present invention, the CN 500 needs to first acquire the MN connection candidate information and prepare the MN connection candidate database. This may be realized by various methods in which the MN connection candidate database prepared by the GW 400 in the first embodiment described above is notified from the GW 400 to the CN 500 and in which an AR neighbor list prepared by exchanging messages between the ARs 300 is notified to the MN 200 connected to the AR 300 and then notified as the MN connection candidate information from the MN 200 to the CN 500.

The third embodiment of the present invention is basically different from the first embodiment described above in only operations of the CN 500 and the GW 400. That is, the operations of the AR 300 and the MN 200 could be the same as those of the first and third embodiments of the present invention. While describing different respects from the first embodiment described above, the operations of the CN 500 and the GW 400 of the third embodiment of the present invention will hereinafter be described with reference to FIG. 6.

In the third embodiment of the present invention, the CN 500 first prepares the MN connection candidate database. That is, in this third embodiment, the processing of the step S1105 of the sequence chart shown in FIG. 6 is performed by the CN 500. Next, in a case where the CN 500 transmits the IP packet to the MN 200, the CN 500 subjects the IP packet to addition processing of the tunneling header and the hop-by-hop option, and then transmits the IP packet. That is, to transmit the IP packet, the CN 500 performs the processing in the steps S1109, S1121 and S1135 of the sequence chart of FIG. 6, and then transmits the IP packet having the format of FIG. 11 in steps S1111, S1123 and S1137.

On the other hand, when the IP packet to be sent to the MN 200 is received from the CN 500 existing outside the GW 400, the GW 400 transfers this IP packet having the format (the format of FIG. 11) as it is to a destination address of the IP packet (the packet shown in FIG. 11 is transferred to a CoA of the $AR_1$ 300-1). That is, the processing in the steps S1109, S1121 and S1135 of the sequence chart of FIG. 6 is not performed by the GW 400 of the third embodiment of the present invention. The subsequent transfer processing between the ARs 300 and the transfer processing to the MN 200 are the same as those of the first embodiment described above.

It is to be noted that even in this third embodiment, in the same manner as in the first and second embodiments described above, as the MN connection candidate information, a CoA of the MN 200 may be used instead of an IP address of the AR 300, or the MN connection candidate database may appropriately be updated.

Figure 19:
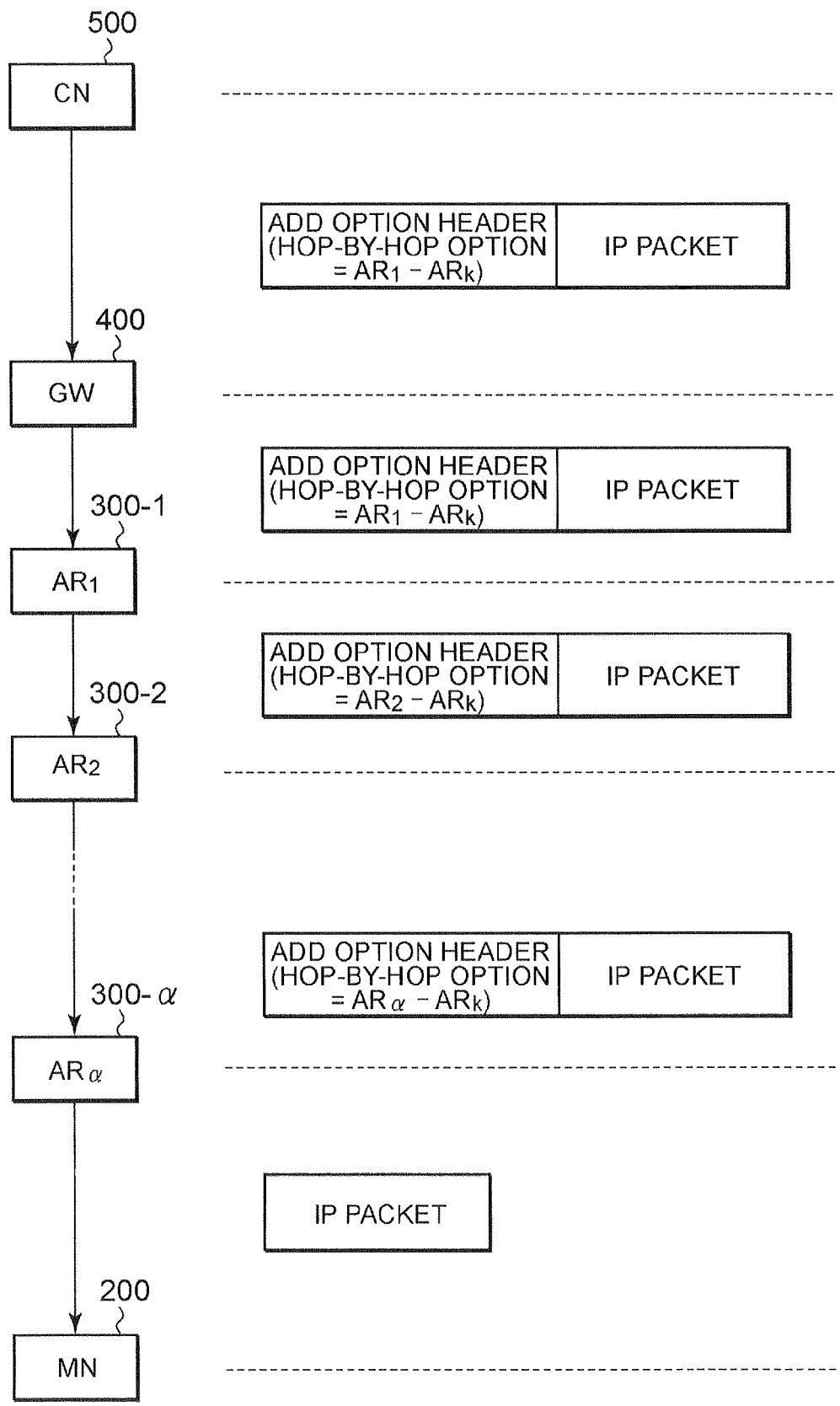
FIG. 19 is a diagram schematically showing another example of the packet to be transmitted according to the third embodiment of the present invention.

Moreover, according to a configuration of the third embodiment described above, it is constituted that the AR 300 deletes the tunneling header and the hop-by-hop option. According to this constitution, a route for searching for the MN 200 (e.g., for following the movement of the MN 200) can be set, but another route setting method may be adopted. Examples of the other route setting method include a method in which, for example, as shown in FIG. 19 and described above in the first embodiment, the hop-by-hop option is directly inserted into the packet.

Fourth Embodiment

Figure 20:
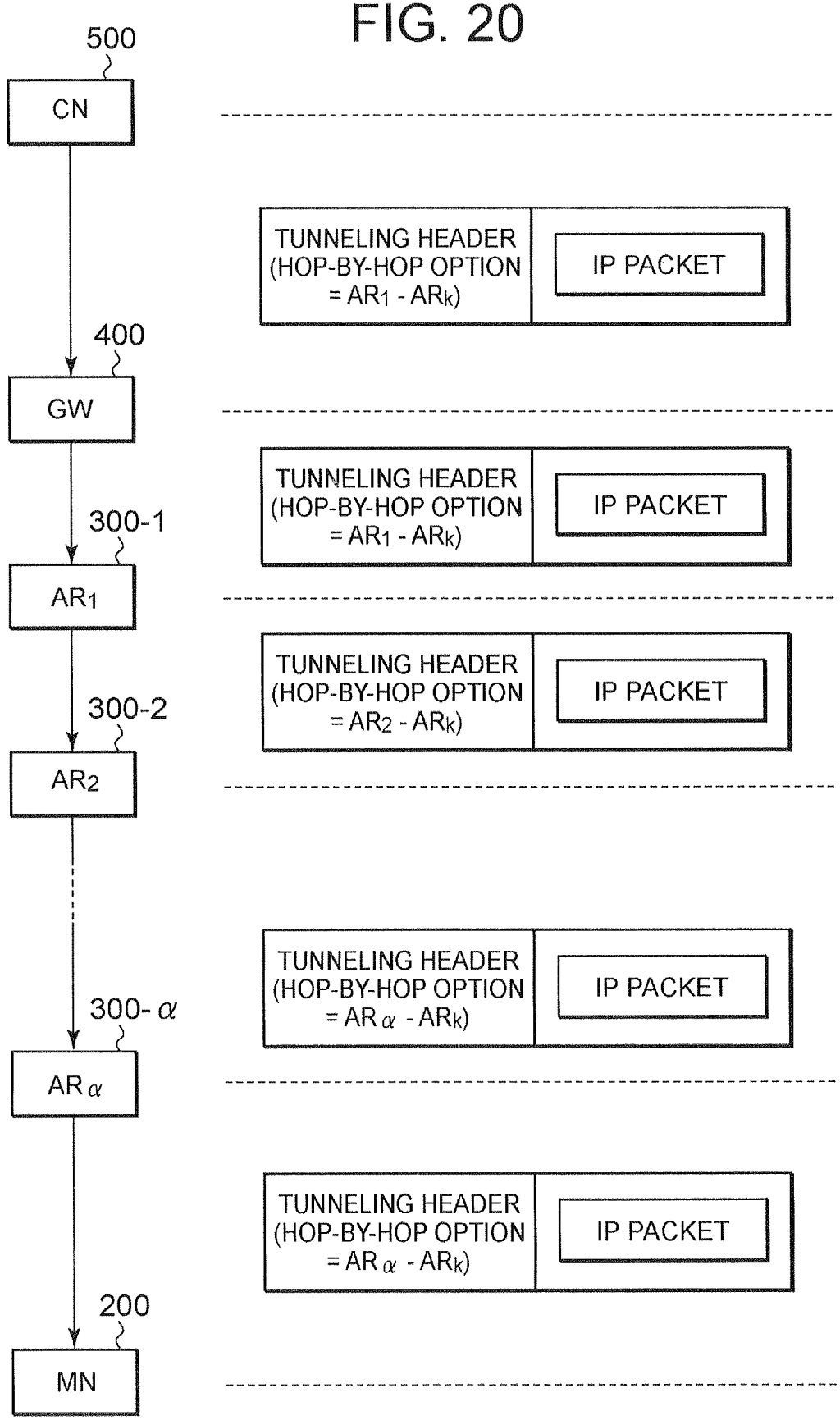
FIG. 20 is a diagram schematically showing one example of a packet to be transmitted according to a fourth embodiment of the present invention.
Figure 21:
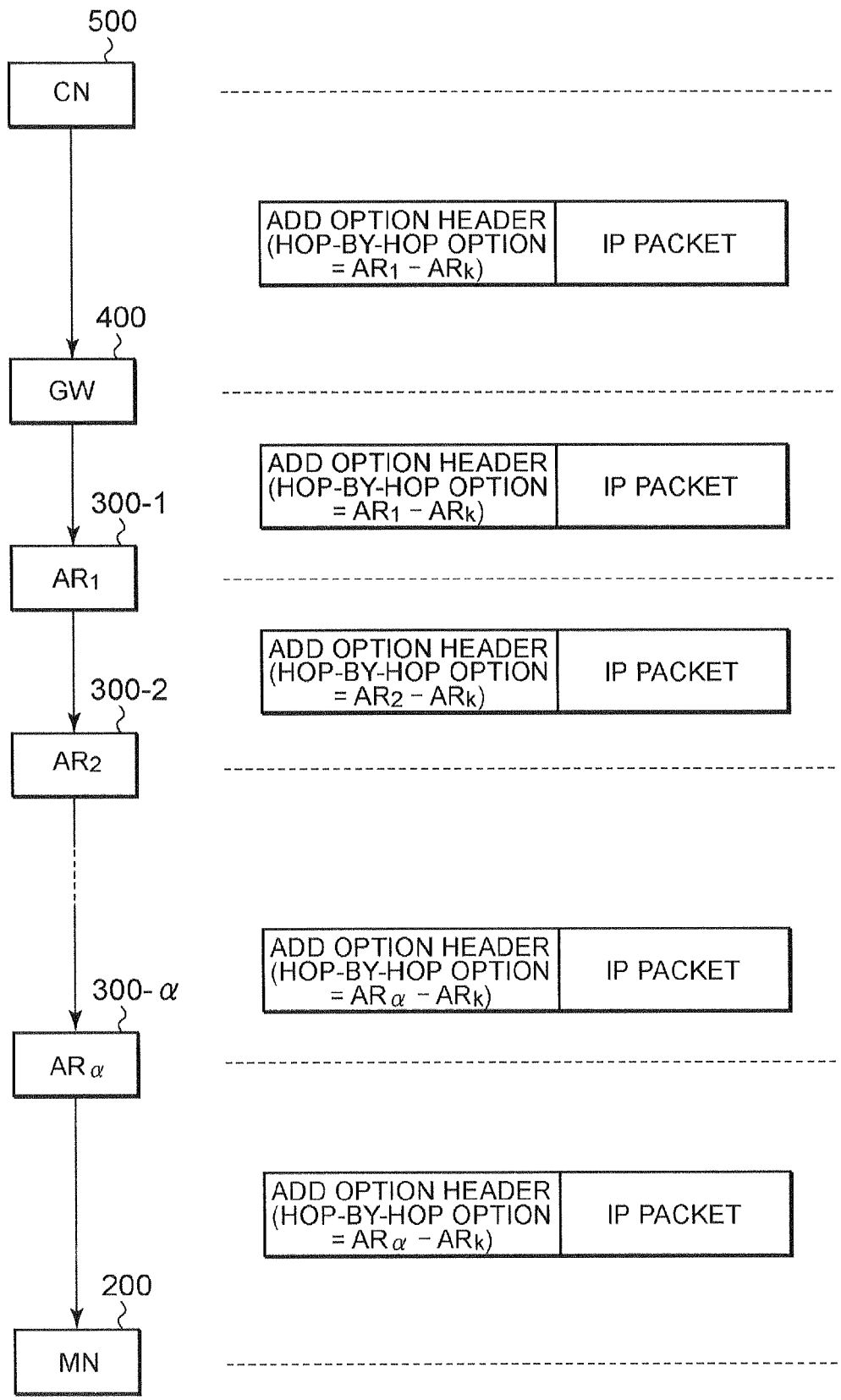
FIG. 21 is a diagram schematically showing another example of the packet to be transmitted according to the fourth embodiment of the present invention.

Next, a fourth embodiment of the present invention will be described. It can be said that the fourth embodiment of the present invention is a combination of the second and third embodiments described above. That is, for example, as shown in FIGS. 20 and 21, it is constituted that transmission processing of an IP packet by a CN 500, transfer processing of the IP packet by a GW 400 and transfer processing of the IP packet between ARs 300 are performed based on an operation of the third embodiment described above and that transmission processing of the IP packet from the AR 300 to an MN 200 and processing of the IP packet in the MN 200 are performed based on the second embodiment described above.

Moreover, since the embodiments described above are variously combined as in this fourth embodiment, another constitution that achieves the object of the present invention can be realized. These combinations may be realized with reference to the embodiments described above, and belong to the scope of the present invention.

As described above, according to the present invention, in a situation in which the MN 200 is connected to one of a plurality of ARs 300 but the AR 300 connected to the MN among these ARs 300 is not clarified, a packet to be sent to the MN 200 is distributed to one of the plurality of ARs 300 potentially connected to the MN 200, and the AR 300 which has received this packet judges whether or not the MN 200 exists under the AR. In a case where the MN 200 exists under the AR, the packet is transferred to the MN 200. On the other hand, when the MN 200 does not exist under the AR, the packet is transferred to another AR 300 potentially connected to the MN 200. As a result, the plurality of ARs 300 potentially connected to the MN 200 can successively judge whether or not the packet can be transferred to the MN 200. Even in a state in which the MN 200 is moving, the packet to be sent to the MN 200 can securely be distributed to the MN 200.

It is to be noted that functional blocks used in the above description of the embodiments of the present invention are typically realized as a large scale integration (LSI) as an integrated circuit. These blocks may individually be formed into one chip, or may be formed into one chip so as to include a part or all of the blocks. It is to be noted that here the LSI is referred, but is sometimes referred to as an integrated circuit (IC), a system LSI, a super LSI or an ultra LSI, depending on a difference of integration.

Moreover, a technique of circuit integration is not limited to the LSI, and may be realized by a circuit for exclusive use or a processor for general use. After manufacturing the LSI, a field programmable gate array (FPGA) which can be programmed and a reconfigurable processor capable of reconfiguring connections and settings of circuit cells of the LSI may be used.

Furthermore, if a technology of the circuit integration which replaces the LSI appears with advancement of a semiconductor technology or another derived technology, needless to say, the functional blocks may be integrated by use of the technology. For example, adaptation of a biological technology and the like could be performed.

INDUSTRIAL APPLICABILITY

The present invention has an effect that a packet to be sent to an MN can securely be distributed to the MN even in a situation in which the MN is moving, and may be applied to an IP mobility technology.

The invention claimed is:

1. A packet transfer method in a communication network system comprising: a plurality of access routers which form predetermined communication areas thereunder, respectively; a mobile terminal which is connected to at least one of the plurality of access routers to perform packet communication with an arbitrary communication device via the connected access router; and a communication partner device which is the arbitrary communication device and which performs the packet communication with the mobile terminal, the method comprising:

a connection candidate information setting step in which a communication device to perform processing concerned with an original packet adds, to the original packet, one of identification information of the plurality of access routers potentially connected to the mobile terminal and identification information of the mobile terminal for use when connected to the plurality of access routers potentially connected to the mobile terminal, respectively, as mobile terminal connection candidate information, before the original packet to be transmitted from the communication partner device to the mobile terminal reaches one of the plurality of access routers potentially connected to the mobile terminal;

a connection confirming step in which one of the plurality of access routers potentially connected to the mobile terminal confirms whether or not the access router is currently connected to the mobile terminal thereunder, in a case where a packet constituted by adding the mobile terminal connection candidate information to the original packet is received;

a packet transmission step in which the access router transmits, to the mobile terminal, the packet or the original packet constituted by removing the mobile terminal connection candidate information from the packet, in a case where it is confirmed in the connection confirming step that the mobile terminal is currently connected; and a packet transfer step in which the access router transfers the packet by unicast to another access router described in the mobile terminal connection candidate information, in a case where it is not confirmed in the connection confirming step that the mobile terminal is currently connected.

2. The packet transfer method according to claim 1, wherein in the connection candidate information setting step, the mobile terminal connection candidate information is set so as to grasp a permutation of the plurality of access routers potentially connected to the mobile terminal, and in the packet transfer step, the access router transfers the packet to another access router positioned next to the permutation of the access router.

3. The packet transfer method according to claim 1, wherein the communication device which adds the mobile terminal connection candidate information to the original packet is at least one of the communication partner device or a gateway which connects a network including the plurality of access routers potentially connected to the mobile terminal to a network in which the communication partner device exists.

4. The packet transfer method according to claim 1, wherein the communication device which adds the mobile terminal connection candidate information to the original packet sets the mobile terminal connection candidate information in an option header of the original packet.

5. The packet transfer method according to claim 1, wherein the communication device which adds the mobile terminal connection candidate information to the original packet performs tunneling of the original packet, and sets the mobile terminal connection candidate information in an option header of the tunneled packet.

6. The packet transfer method according to claim 1, wherein a plurality of access routers potentially subsequently connected to the mobile terminal are presumed at an arbitrary timing based on position information of the access router currently connected to the mobile terminal and arrangement position information of the plurality of access routers, and the mobile terminal connection candidate information is generated from a presumption result.

7. The packet transfer method according to claim 1, wherein in a case where a movement direction of the mobile terminal is grasped, information is deleted from the mobile terminal connection candidate information on an access router disconnected from the mobile terminal.

8. A packet processing method in an access router of a communication network system comprising: a plurality of access routers which form predetermined communication areas thereunder, respectively; and a mobile terminal which is connected to at least one of the plurality of access routers to perform packet communication with a communication partner device via the connected access router, the method comprising:

a packet reception step in which a communication device to perform processing concerned with an original packet receives a packet constituted by adding, to the original packet, at least one of identification information of the plurality of access routers potentially connected to the mobile terminal and identification information of the mobile terminal for use when connected to the plurality of access routers potentially connected to the mobile terminal, respectively, as mobile terminal connection candidate information, before the original packet to be transmitted from the communication partner device to the mobile terminal reaches at least one of the plurality of access routers potentially connected to the mobile terminal;

a connection confirming step in which the access router confirms whether or not the access router is currently connected to the mobile terminal thereunder, in a case where a packet constituted by adding the mobile terminal connection candidate information to the original packet is received;

a packet transmission step in which the access router transmits, to the mobile terminal, the packet or the original packet constituted by removing the mobile terminal connection candidate information from the packet, in a case where it is confirmed in the connection confirming step that the mobile terminal is currently connected; and a packet transfer step in which the access router transfers the packet by unicast to another access router described in the mobile terminal connection candidate information, in a case where it is not confirmed in the connection confirming step that the mobile terminal is currently connected.

9. A packet processing method in a communication partner device of a communication network system comprising: a plurality of access routers which form predetermined communication areas thereunder, respectively; a mobile terminal which is connected to at least one of the plurality of access routers to perform packet communication with an arbitrary communication device via the connected access router; and a communication partner device which is the arbitrary communication device and which performs the packet communication with the mobile terminal, the method comprising:

a connection candidate information setting step of adding, to an original packet to be transmitted from the communication partner device to the mobile terminal, one of identification information of the plurality of access routers potentially connected to the mobile terminal and identification information of the mobile terminal for use when connected to the plurality of access routers potentially connected to the mobile terminal, respectively, as mobile terminal connection candidate information;

a selection step of selecting an access router to which a packet constituted by adding the mobile terminal connection candidate information to the original packet is transmitted, based on the mobile terminal connection candidate information; and a packet transmission step of transmitting by unicast, to the selected access router, the packet constituted by adding the mobile terminal connection candidate information to the original packet.

10. A packet processing method in a gateway of a communication network system comprising: a plurality of access routers which form predetermined communication areas thereunder, respectively; a mobile terminal which is connected to at least one of the plurality of access routers to perform packet communication with an arbitrary communication device via the connected access router; a communication partner device which is the arbitrary communication device and which performs the packet communication with the mobile terminal; and the gateway which connects a network including the plurality of access routers to a network in which the communication partner device exists, the method comprising:

a packet reception step of receiving an original packet transmitted from the communication partner device to the mobile terminal;

a connection candidate information setting step of adding, to the original packet, at least one of identification information of the plurality of access routers potentially connected to the mobile terminal and identification information of the mobile terminal for use when connected to the plurality of access routers potentially connected to the mobile terminal, respectively, as mobile terminal connection candidate information;

a selection step of selecting an access router to which a packet constituted by adding the mobile terminal connection candidate information to the original packet is transmitted, based on the mobile terminal connection candidate information; and a packet transmission step of transmitting by unicast, to the selected access router, the packet constituted by adding the mobile terminal connection candidate information to the original packet.

11. A packet transfer method in a communication network system comprising: a plurality of access routers which form predetermined communication areas thereunder, respectively; a mobile terminal which is connected to at least one of the plurality of access routers to perform packet communication with an arbitrary communication device via the connected access router; and a communication partner device which is the arbitrary communication device and which performs the packet communication with the mobile terminal, the method comprising:

a connection candidate information setting step in which a communication device to perform processing concerned with an original packet adds, to the original packet, one of identification information of the plurality of access routers potentially connected to the mobile terminal and identification information of the mobile terminal for use when connected to the plurality of access routers potentially connected to the mobile terminal, respectively, as mobile terminal connection candidate information, before the original packet to be transmitted from the communication partner device to the mobile terminal reaches one of the plurality of access routers potentially connected to the mobile terminal;

a selection step in which the communication device selects an access router to which a packet constituted by adding the mobile terminal connection candidate information to the original packet is transmitted, based on the mobile terminal connection candidate information;

a connection confirming step in which the selected access router confirms whether or not the access router is currently connected to the mobile terminal thereunder, in a case where the packet constituted by adding the mobile terminal connection candidate information to the original packet is received;

a packet transmission step in which the access router transmits, to the mobile terminal, the packet or the original packet constituted by removing the mobile terminal connection candidate information from the packet, in a case where it is confirmed in the connection confirming step that the mobile terminal is currently connected; and a packet transfer step in which the access router transfers the packet by unicast to another access router selected among a plurality of access routers described in the mobile terminal connection candidate information, in a case where it is not confirmed in the connection confirming step that the mobile terminal is currently connected.

12. A packet processing method in an access router of a communication network system comprising: a plurality of access routers which form predetermined communication areas thereunder, respectively; and a mobile terminal which is connected to at least one of the plurality of access routers to perform packet communication with a communication partner device via the connected access router, the method comprising:

a packet reception step in which a communication device to perform processing concerned with an original packet receives a packet constituted by adding, to the original packet, at least one of identification information of the plurality of access routers potentially connected to the mobile terminal and identification information of the mobile terminal for use when connected to the plurality of access routers potentially connected to the mobile terminal, respectively, as mobile terminal connection candidate information, before the original packet to be transmitted from the communication partner device to the mobile terminal reaches at least one of the plurality of access routers potentially connected to the mobile terminal;

a connection confirming step in which the access router confirms whether or not the access router is currently connected to the mobile terminal thereunder, in a case where a packet constituted by adding the mobile terminal connection candidate information to the original packet is received;

a packet transmission step in which the access router transmits, to the mobile terminal, the packet or the original packet constituted by removing the mobile terminal connection candidate information from the packet, in a case where it is confirmed in the connection confirming step that the mobile terminal is currently connected; and a packet transfer step in which the access router transfers the packet by unicast to another access router selected among a plurality of access routers described in the mobile terminal connection candidate information, in a case where it is not confirmed in the connection confirming step that the mobile terminal is currently connected.

* * * * *